US008717317B2

(12) United States Patent
Akiyoshi

(10) Patent No.: US 8,717,317 B2
(45) Date of Patent: May 6, 2014

(54) DISPLAY CONTROL DEVICE AND METHOD FOR CONTROLLING DISPLAY ON TOUCH PANEL, AND STORAGE MEDIUM

(75) Inventor: Hidenobu Akiyoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 13/023,995

(22) Filed: Feb. 9, 2011

(65) Prior Publication Data
US 2011/0205171 A1 Aug. 25, 2011

(30) Foreign Application Priority Data

Feb. 22, 2010 (JP) ................................. 2010-036381
Feb. 22, 2010 (JP) ................................. 2010-036398
Feb. 22, 2010 (JP) ................................. 2010-036466

(51) Int. Cl.
G06F 3/041 (2006.01)

(52) U.S. Cl.
USPC ......................................... 345/173; 715/702

(58) Field of Classification Search
USPC ......................... 345/173–175; 715/702, 716
See application file for complete search history.

(56) References Cited

U.S. PATENT DOCUMENTS

| 7,936,341 | B2 * | 5/2011 | Weiss .............................. 345/173 |
| 7,956,847 | B2 * | 6/2011 | Christie ......................... 345/173 |
| 8,195,032 | B2 * | 6/2012 | Itoh et al. ....................... 386/278 |
| 8,219,937 | B2 * | 7/2012 | Coddington ................... 715/863 |
| 8,441,451 | B2 * | 5/2013 | Son ................................. 345/173 |
| 8,502,789 | B2 * | 8/2013 | Tse et al. ....................... 345/173 |
| 2004/0233216 | A1 * | 11/2004 | Rekimoto et al. ............ 345/592 |
| 2006/0117067 | A1 * | 6/2006 | Wright et al. ............... 707/104.1 |
| 2006/0197753 | A1 * | 9/2006 | Hotelling ....................... 345/173 |
| 2007/0061745 | A1 * | 3/2007 | Anthony et al. ............... 715/764 |
| 2008/0122796 | A1 * | 5/2008 | Jobs et al. ...................... 345/173 |
| 2008/0155413 | A1 * | 6/2008 | Ubillos .......................... 715/716 |

(Continued)

FOREIGN PATENT DOCUMENTS

| JP | 2001-228971 |  | 8/2001 |
| JP | 2008-263457 | A | 10/2008 |
| JP | 2009-294857 | A | 12/2009 |

OTHER PUBLICATIONS

U.S. references and foreign reference 1 were cited in a Oct. 1, 2013 Japanese Office Action, which is enclosed without an English Translation, that issued in Japanese Patent Application No. 2010-036381.

(Continued)

*Primary Examiner* — Amare Mengistu
*Assistant Examiner* — Sarvesh J Nadkarni
(74) *Attorney, Agent, or Firm* — Cowan, Liebowitz & Latman, P.C.

(57) ABSTRACT

A display control device that facilitates an operation on a touch panel, for the timeline display of a moving image. A synthesis section controls display on a touch panel. A touch state-detecting section detects any touched position on the touch panel, and determines whether two touched positions are detected on a single display object displayed on the touch panel. Determining that two touched positions are detected on the single display object, the touch state-detecting section determines whether the detected touched positions are moved while keeping their touched states. When the touched positions are determined to be moved while keeping their touched states, an overall controller extracts frame images of which the number depends on a distance between the two touched positions after the movement thereof, and controls the synthesis section to display the extracted frame images between the two moved touched positions.

19 Claims, 16 Drawing Sheets

(56) References Cited

U.S. PATENT DOCUMENTS

| | | | |
|---|---|---|---|
| 2008/0158191 A1* | 7/2008 | Yang et al. | 345/173 |
| 2008/0165141 A1* | 7/2008 | Christie | 345/173 |
| 2008/0253737 A1* | 10/2008 | Kimura et al. | 386/68 |
| 2008/0297482 A1* | 12/2008 | Weiss | 345/173 |
| 2009/0028432 A1* | 1/2009 | Rossato et al. | 382/173 |
| 2009/0144623 A1* | 6/2009 | Jung | 715/716 |
| 2009/0160778 A1* | 6/2009 | Nurmi et al. | 345/173 |
| 2009/0282162 A1* | 11/2009 | Mehrotra et al. | 709/233 |
| 2009/0300530 A1* | 12/2009 | Falchuk | 715/764 |
| 2009/0307589 A1* | 12/2009 | Inose et al. | 715/702 |
| 2010/0031203 A1* | 2/2010 | Morris et al. | 715/863 |
| 2010/0053342 A1* | 3/2010 | Hwang et al. | 348/207.99 |
| 2010/0058182 A1* | 3/2010 | Jung | 715/702 |
| 2010/0077337 A1* | 3/2010 | Yang et al. | 715/771 |
| 2010/0083111 A1* | 4/2010 | de los Reyes | 715/702 |
| 2010/0171712 A1* | 7/2010 | Cieplinski et al. | 345/173 |
| 2010/0201634 A1* | 8/2010 | Coddington | 345/173 |
| 2011/0004853 A1* | 1/2011 | Chang | 715/863 |
| 2011/0069019 A1* | 3/2011 | Carpendale et al. | 345/173 |
| 2011/0074694 A1* | 3/2011 | Rapp et al. | 345/173 |
| 2011/0102464 A1* | 5/2011 | Godavari | 345/650 |
| 2011/0163971 A1* | 7/2011 | Wagner et al. | 345/173 |
| 2011/0169748 A1* | 7/2011 | Tse et al. | 345/173 |

OTHER PUBLICATIONS

Foreign reference 2 was cited in a Oct. 1, 2013 Japanese Office Action, which is enclosed without an English Translation, that issued in Japanese Patent Application No. 2010-036398.

\* cited by examiner

DISPLAY CONTROL DEVICE AND METHOD FOR CONTROLLING DISPLAY ON TOUCH PANEL, AND STORAGE MEDIUM

BACKGROUND OF THE INVENTION

1. Field of the Invention

The present invention relates to a display control device and method, and a storage medium, and more particularly to a technique suitable for use in operating a touch panel or the like.

2. Description of the Related Art

In recent years, various kinds of electronic device products are equipped with a touch panel. The touch panel is excellent in user interface, and is capable of intuitively displaying operations and responses. To operate such a touch panel, a technique related to movement of fingers on the tough panel and responses thereto from the system is described in e.g. Japanese Patent Laid-Open Publication No. 2001-228971. According to the technique described in Japanese Patent Laid-Open Publication No. 2001-228971, it is possible to change the operation of the system according to the distance between fingers on the touch panel. Further, this publication describes that when a plurality of fingers are detected, a predetermined operation is performed according to the distance between two of them at outermost ends.

Further, recent digital video cameras are equipped with a function called "index screen display" for showing a list of moving image data items stored in a storage medium to a user in order to enable the user to select a desired one of them. This is a function that extracts one frame image determined in advance out of each long moving image data, and arranges the extracted frame images on an index screen. This enables the user to select a desired moving image while watching the index screen, and reproduce and edit the selected moving image.

Further, in recent years, some of digital video cameras are capable of extracting not only one frame image, but a plurality of frame images at time positions corresponding to respective time points at intervals of a few seconds out of a moving image and displaying the extracted frame images on a display screen. The user can grasp an outline and flow of the moving image by viewing the frame images contained in the moving image at the respective time positions. It should be noted that the function that extracts and displays frame images at time positions corresponding to respective time points at intervals of a predetermined time period out of a moving image is called "timeline display".

To manipulate the above-mentioned timeline display of a moving image by user's finger operation on a touch panel, it is necessary to detect the position and movement of a finger. On the other hand, although Japanese Patent Laid-Open Publication No. 2001-228971 describes how the system operates when a plurality of fingers touch the touch panel, it is not a technique which is intended for the timeline display of a moving image. Therefore, there is a problem that the technique is not user-friendly enough for the timeline display of a moving image.

In general, in a personal computer, when copying an object displayed on a screen such as a file, the object to be copied is designated using a mouse, whereby the copy and paste operation is performed. Further, it is also possible to perform the copy and paste operation by combining an input using the keyboard and an operation using the mouse.

Further, as described above, some of recent digital video cameras are equipped with an edit function for cutting out part of a moving image stored in a storage medium to make a new moving image, or cutting out one frame of a moving image to make a still image. When a certain range of one moving image is cut out, it is necessary to designate two edit points, i.e. a start point at which the edit of the moving image is started and an end point at which the edit of the same is terminated. Further, when a still image is cut out from a moving image, it is necessary to designate a cut-out point indicating a desired scene in the moving image.

However, when the edit operation is performed on a digital video camera which is compact enough to be hand-held, the sequence of operations using buttons is troublesome. Therefore, to facilitate the user's operation, there has been proposed a technique in which the digital video camera is equipped with a touch panel on which an instructing operation is performed by using movement of fingers. In this connection, for example, as mentioned above, the technique related to movement of fingers on a tough panel and responses from the system is described in Japanese Patent Laid-Open Publication No. 2001-228971. According to the technique described in Japanese Patent Laid-Open Publication No. 2001-228971, it is possible to change the operation of the system according to the distance between fingers on the touch panel.

However, although Japanese Patent Laid-Open Publication No. 2001-228971 describes how the system operates when a plurality of fingers touch the touch panel, it is not a technique specifically intended for an operation for copying a moving image or an operation for cutting out a still image. Therefore, there is a problem that the user cannot perform the operation for copying a moving image or cutting out a still image on the touch panel, and hence the technique is not user-friendly enough.

When editing a moving image by a personal computer, the moving image is edited using dedicated software. Particularly, when connecting two moving images, the two moving images are connected on the software to thereby create a new single moving image.

Further, some of recent digital video cameras are capable of connecting a plurality of moving images stored in a storage medium as a play list to thereby create a new moving image. In the operation of connecting a moving image with another moving image, first, a moving image to be connected is added to the end of the play list, and further, the order of the moving images is changed to edit the moving images such that a desired flow of the moving images is made.

Further, to enable users to easily edit moving images or the like, in a digital video camera equipped with a touch panel, there has been proposed, as described above, the method of performing an edit operation using movement of a plurality of fingers on the touch panel. The above-mentioned Japanese Patent Laid-Open Publication No. 2001-228971 describes the technique related to movement of fingers on the touch panel and responses from the system in the operation on such a touch panel.

However, although Japanese Patent Laid-Open Publication No. 2001-228971 describes how the system operates when a plurality of fingers touch the touch panel, it is not a technique specifically intended for an operation for connecting moving images. Therefore, there is a problem that the user cannot performing the operation for connecting moving images on the touch panel, and hence the technique is not user-friendly enough.

SUMMARY OF THE INVENTION

The present invention provides a display control device that facilitates manipulation of timeline display of a moving image on a touch panel.

Further, the present invention provides a display control device that facilitates operations on a touch panel, for copying a moving image and cutting out a still image.

Furthermore, the present invention provides a display control device that facilitates an operation on a touch panel, for connecting moving images.

In a first aspect of the present invention, there is provided a display control device, comprising a display section, a display control unit configured to control the display section to display at least one display object each representing a moving image, a detection unit configured to detect any touched position on the display section, a first determination unit configured to determine whether or not two touched positions are detected on a single one of the at least one display object displayed on the display section, by the detection unit, a second determination unit configured to be operable when the first determination unit determines that two touched positions are detected on the single display object, to determine based on detection by the detection unit whether or not the two touched positions are moved while each keeping a touched state thereof, and a control unit configured to be operable when the second determination unit determines that the two touched positions are moved while each keeping a touched state thereof, to extract frame images of which the number depends on a distance between the two touched positions after movement thereof, from a moving image represented by the single display object, and control the display control unit to display the extracted frame images between the two touched positions after the movement thereof.

In a second aspect of the present invention, there is provided a method of controlling display of a display object representing a moving image on a display section, comprising detecting any touched position on the display section, determining whether or not two touched positions are detected on a single display object displayed on the display section, by the detecting, determining based on detection by the detecting, when it is determined that two touched positions are detected on the single display object, whether or not the two touched positions are moved while each keeping a touched state thereof, and extracting, when it is determined that the two touched positions are moved while each keeping a touched state thereof, frame images of which the number depends on a distance between the two touched positions after movement thereof, from a moving image represented by the single display object, and causing the extracted frame images to be displayed between the two touched positions after the movement thereof.

In a third aspect of the present invention, there is provided a non-transitory computer-readable storage medium storing a computer-executable program for causing a computer to execute a method of controlling display of a display object representing a moving image on a display section, wherein the method comprises detecting any touched position on the display section, determining whether or not two touched positions are detected on a single display object displayed on the display section, by the detecting, determining based on detection by the detecting, when it is determined that two touched positions are detected on the single display object, whether or not the two touched positions are moved while each keeping a touched state thereof, and extracting, when it is determined that the two touched positions are moved while each keeping a touched state thereof, frame images of which the number depends on a distance between the two touched positions after movement thereof, from a moving image represented by the single display object, and causing the extracted frame images to be displayed between the two touched positions after the movement thereof.

According to the present invention, it is possible to easily control the timeline display of a moving image on the touch panel.

In a fourth aspect of the present invention, there is provided a display control device, comprising a display section, a display control unit configured to control the display section to display at least one display object each representing a content data item, a detection unit configured to detect any touched position on the display section, a first determination unit configured to determine whether or not two touched positions are detected on a single one of the at least one display object displayed on the display section, by the detection unit, a second determination unit configured to be operable when the first determination unit determines that two touched positions are detected on the single display object, to determine whether or not the two touched positions are moved while each keeping a touched state thereof and a distance between the two touched positions after movement thereof has become not smaller than a predetermined value, and a control unit configured to be operable when the second determination unit determines that the distance between the two touched positions after the movement thereof has become not smaller than the predetermined value, to cause a duplicate of a content data item represented by the single display object to be formed and stored in a storage medium.

In a fifth aspect of the present invention, there is provided a display control device, comprising a display section, a display control unit configured to control the display section to display at least one display object each representing a moving image, a detection unit configured to detect any touched position on the display section, a first determination unit configured to determine whether or not three touched positions are detected on a single one of the at least one display object displayed on the display section, by the detection unit, a second determination unit configured to be operable when the first determination unit determines that three touched positions are detected on the single display object, to determine whether or not one or two of the touched positions is or are moved while each keeping a touched state thereof and a distance between the one or two of the touched positions after movement thereof and the one or two of the touched positions before the movement thereof has become not smaller than a predetermined value, and a control unit configured to be operable when the second determination unit determines that the distance between the one or two of the touched positions after the movement thereof and the one or two of the touched positions before the movement thereof has become not smaller than the predetermined value, to cause a duplicate of a portion of the moving image represented by the single moving object, the portion associated with the one or two of the touched positions, to be formed and stored in a storage medium.

In a sixth aspect of the present invention, there is provided a method of controlling display of a display object representing content data on a display section, comprising detecting any touched position on the display section, determining whether or not two touched positions are detected on a single display object displayed on the display section by the detecting, determining, when it is determined that that two touched positions are detected on the single display object, whether or not the two touched positions are moved while each keeping a touched state thereof and a distance between the two touched positions after movement thereof has become not smaller than a predetermined value, and causing, when it is determined that the distance between the two touched positions after the movement thereof has become not smaller than the predetermined value, a duplicate of a content data item represented by the single display object to be formed and stored in a storage medium.

In a seventh aspect of the present invention, there is provided a method of controlling display of a display object representing a moving image on a display section, comprising detecting any touched position on the display section, determining whether or not three touched positions are detected on a single display object displayed on the display section, by the detecting, determining, when it is determined that three touched positions are detected on the single display object, whether or not one or two of the touched positions is or are moved while each keeping a touched state thereof and a distance between the one or two of the touched positions after movement thereof and the one or two of the touched positions before the movement thereof has become not smaller than a predetermined value, and causing, when it is determined that the distance between the one or two of the touched positions after the movement thereof and the one or two of the touched positions before the movement thereof has become not smaller than the predetermined value, a duplicate of a portion of the moving image represented by the single moving object, the portion associated with the one or two of the touched positions, to be formed and stored in a storage medium.

In an eighth aspect of the present invention, there is provided a non-transitory computer-readable storage medium storing a computer-executable program for causing a computer to execute a method of controlling display of a display object representing content data on a display section, wherein the method comprises detecting any touched position on the display section, determining whether or not two touched positions are detected on a single display object displayed on the display section by the detecting, determining, when it is determined that that two touched positions are detected on the single display object, whether or not the two touched positions are moved while each keeping a touched state thereof and a distance between the two touched positions after movement thereof has become not smaller than a predetermined value, and causing, when it is determined that the distance between the two touched positions after the movement thereof has become not smaller than the predetermined value, a duplicate of a content data item represented by the single display object to be formed and stored in a storage medium.

In a ninth aspect of the present invention, there is provided a non-transitory computer-readable storage medium storing a computer-executable program for causing a computer to execute a method of controlling display of a display object representing a moving image on a display section, wherein the method comprises detecting any touched position on the display section, determining whether or not three touched positions are detected on a single display object displayed on the display section, by the detecting, determining, when it is determined that three touched positions are detected on the single display object, whether or not one or two of the touched positions is or are moved while each keeping a touched state thereof and a distance between the one or two of the touched positions after movement thereof and the one or two of the touched positions before the movement thereof has become not smaller than a predetermined value, and causing, when it is determined that the distance between the one or two of the touched positions after the movement thereof and the one or two of the touched positions before the movement thereof has become not smaller than the predetermined value, a duplicate of a portion of the moving image represented by the single moving object, the portion associated with the one or two of the touched positions, to be formed and stored in a storage medium.

According to the present invention, it is possible to easily perform operations on the touch panel, for copying all or part of a moving image and cutting out the same as a still image.

In a tenth aspect of the present invention, there is provided a display control device, comprising a display section, a display control unit configured to control the display section to display display objects representing respective moving images, a detection unit configured to detect any touched position on the display section, a position change control unit configured to control the display control unit to change a display position of the display object displayed at the touched position detected by the detection unit in a manner following movement of the touched position, a first determination unit configured to determine whether or not two positions on the display section are touched, and different display objects are touched at the touched positions, respectively, and a second determination unit configured to be operable when the first determination unit determines that the two different display objects are touched, to determine whether or not a distance between the two touched positions has become not larger than a predetermined value by the movement of the touched positions, and a control unit configured to be operable when the second determination unit determines that the distance between the two touched positions has become not larger than the predetermined value, to cause a single moving image to be created in which moving images represented by the different display objects, respectively, are connected in an order based on respective display positions of the display objects caused to be changed through control by the position change control unit.

In an eleventh aspect of the present invention, there is provided a method of controlling display of a display object representing a moving image on a display section, comprising detecting any touched position on the display section, causing a display position of the display object displayed at the touched position detected by the detecting to be changed in a manner following movement of the touched position, determining whether or not two positions on the display section are touched, and different display objects are touched at the touched positions, respectively, and determining, when it is determined that the two different display objects are touched, whether or not a distance between the two touched positions has become not larger than a predetermined value by the movement of the touched positions, and causing, when it is determined that the distance between the two touched positions has become not larger than the predetermined value, a single moving image to be created in which moving images represented by the different display objects, respectively, are connected in an order based on respective display positions of the display objects caused to be changed by the causing.

In a twelfth aspect of the present invention, there is provided a non-transitory computer-readable storage medium storing a computer-executable program for causing a computer to execute a method of controlling display of a display object representing a moving image on a display section, wherein the method comprises detecting any touched position on the display section, causing a display position of the display object displayed at the touched position detected by the detecting to be changed in a manner following movement of the touched position, determining whether or not two positions on the display section are touched, and different display objects are touched at the touched positions, respectively, and determining, when it is determined that the two different display objects are touched, whether or not a distance between the two touched positions has become not larger than a predetermined value by the movement of the touched positions, and causing, when it is determined that the distance between the two touched positions has become not larger than the predetermined value, a single moving image to be created in which moving images represented by the different display objects, respectively, are connected in an order based on respective display positions of the display objects caused to be changed by the causing.

According to the present invention, it is possible to easily perform an edit operation on the touch panel, for connecting moving images.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing an embodiment thereof.

Figure 1:
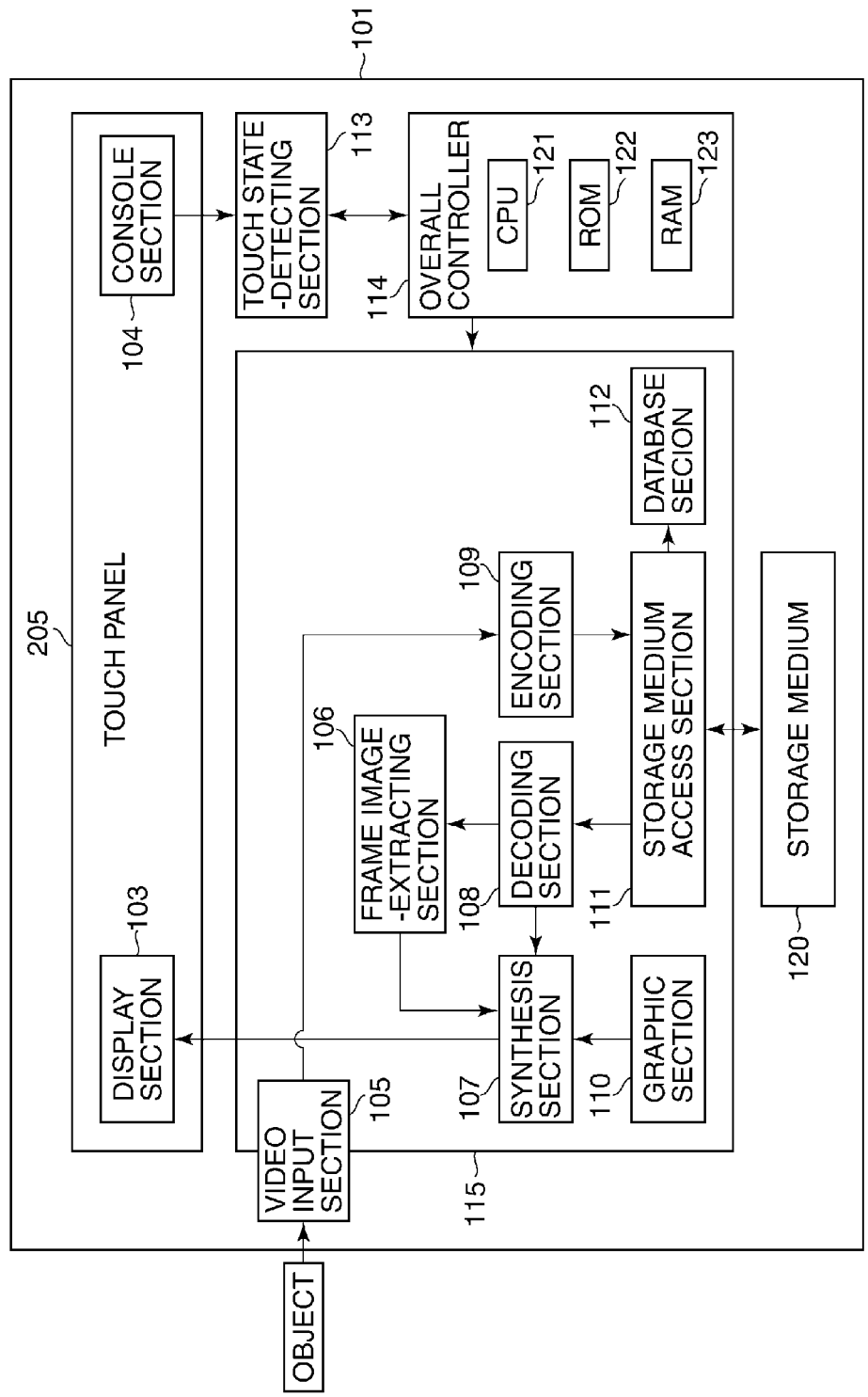
FIG. 1 is a block diagram of a digital camera incorporating a display control device according to an embodiment of the present invention.

FIG. 1 is a block diagram of a digital camera 101 incorporating a display control device according to the present embodiment. In FIG. 1, the digital camera 101 is capable of shooting and reproducing moving images and still images. A touch panel 205 comprises a display section 103, such as an LED (Light Emitting Diode), and a console section 104 which converts a touch operation by a user into an input signal. The display section 103 displays a moving image shot by the digital camera 101 and instruction buttons for operation by the user. The display section 103 further displays information concerning the digital camera 101, the remaining capacity of a storage medium 120, and so forth. The console section 104 receives instructions from the user e.g. via buttons displayed on the display section 103.

A video input section 105 picks up an image of an object and inputs a video signal when shooting is performed by the digital camera 101. A frame image-extracting section 106 creates a frame image at a time position designated by a user, from a moving image stored in the storage medium 120. A synthesis section 107 functions as a display control unit that synthesizes character information, an image, a frame image created by the frame image-extracting section 106, etc. and causes the synthesized image to be displayed on the display section 103 of the touch panel 205. A decoding section 108 decodes moving image data and still image data stored in the storage medium 120. An encoding section 109 encodes a video signal of a moving image input from the video input section 105 when recording the moving image.

A graphic section 110 creates an image for displaying various items of information on the digital camera 101 on the display section 103. For example, the graphic section 110 creates an image formed by converting information on a clock, a remaining battery charge, the remaining capacity of a storage medium, and the number of recorded moving images, into graphics. A storage medium access section 111 is an interface that stores moving image data in the storage medium 120 when recording a moving image, and reproduces the moving image data from the storage medium 120 when playing back the moving image. A database section 112 holds information associated with moving image data stored in the storage medium 120.

A touch state-detecting section 113 detects how many fingers of the user are touching the touch panel 205, where the fingers are touching, and so forth. An overall controller 114 is connected to blocks of a digital camera base unit 115, and appropriately controls the blocks for recording and reproduction operations. It should be noted that processes described hereinafter with reference to flowcharts illustrated in figures are each executed by a CPU 121 which loads a program stored in a ROM 122 into a RAM 123, executing the same, and controls the sections of the digital camera 101. Further, the storage medium 120 is a removable storage medium.

Figure 2A:
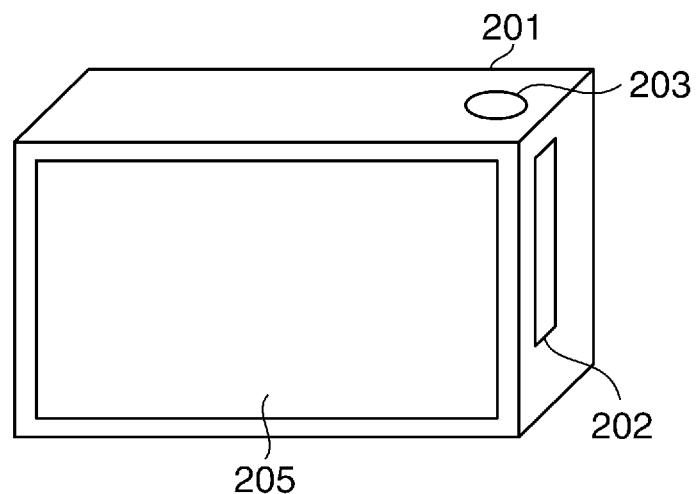
FIGS. 2A and 2B are perspective views showing the appearance of the digital camera.
Figure 2B:
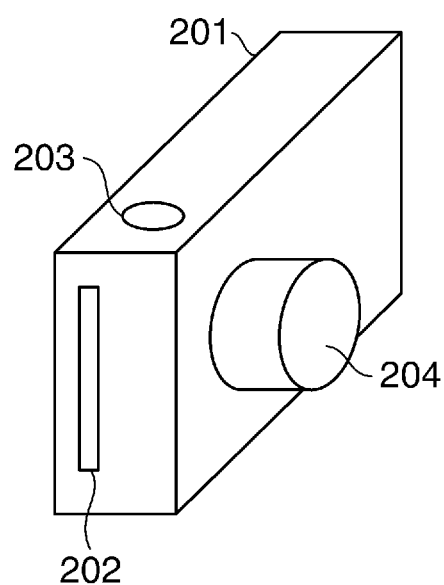

FIGS. 2A and 2B are perspective views showing the appearance of the digital camera 101 in FIG. 1. In FIGS. 2A and 2B, the appearance of the same digital camera is viewed from different angles, respectively.

In FIGS. 2A and 2B, a casing 201 of the digital camera 101 is provided with an insertion slot 202 for the storage medium 120, and the storage medium 120 is inserted from the insertion slot 202. A power button 203 is used for turning on and off the main power of the digital camera 101. A lens 204 is a lens barrel of the digital camera 101. The touch panel 205 serves as both the display section 103 and the console section 104, and the user performs all of operations including recording and reproduction instructions and an edit instruction on the touch panel 205.

Figure 3:
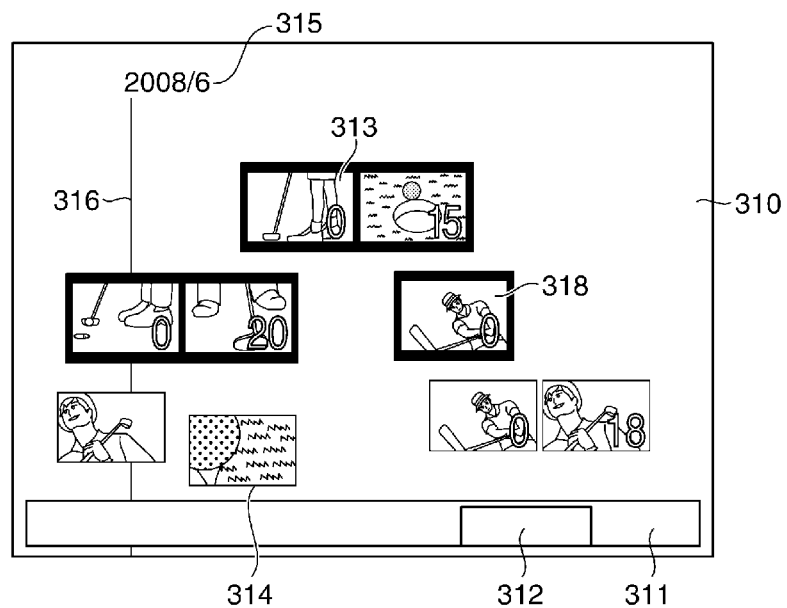
FIG. 3 is a view showing an example of display of moving image objects and still image objects in the embodiment.

FIG. 3 is a view showing an example of display of moving image objects and still image objects as display objects respectively representing index entries of an index of moving images and still images, in the present embodiment. Each moving image object is a collection of frame images which are extracted from a moving image (data item) and displayed to show an index entry representative of the moving image (data item).

FIG. 3 shows a display screen 310 of the touch panel 205 on which moving image objects and still image objects are displayed so as to show entries of the index. In the illustrated example of FIG. 3, the index is arranged in an imaginary display space extending horizontally, and part of the index is cut out and displayed on the display screen 310, such that the objects are displayed in chronological order from the left to the right.

A total bar 311 represents the whole display space as a bar. An area bar 312 represents an area within the display space, which is actually displayed on the display screen 310. An index entry 313 indicates an entry of e.g. a moving image, and is capable of displaying a plurality of frame images as representative of a moving image object. Further, the frame images of one index entry are displayed in a manner surrounded by a black frame. Further, at a lower right corner of each frame image, a time position of the frame image is additionally displayed in the form of a time period to elapse from the start of the moving image object.

The index entry 313 in FIG. 3 represents, by way of example, a moving object which lasts for 15 seconds or so when played back, and is composed of two images: a frame image at the 0th second and a frame image at the 15th second. An index entry 314 represents a still image object which is displayed on the display screen 310 without adding a black frame so as to show it in a manner distinguished from frame images. The user can discern between still image objects and moving image objects by paying attention to whether or not a black frame is added thereto. It should be noted that in the present embodiment, a detailed description will be given of timeline display of moving image objects, and description of a method of displaying still images is omitted. Further, an indication 315 indicates shooting time of the currently displayed index entries in a simplified manner, and a bar 316 indicates a start of the date.

Figure 4A:
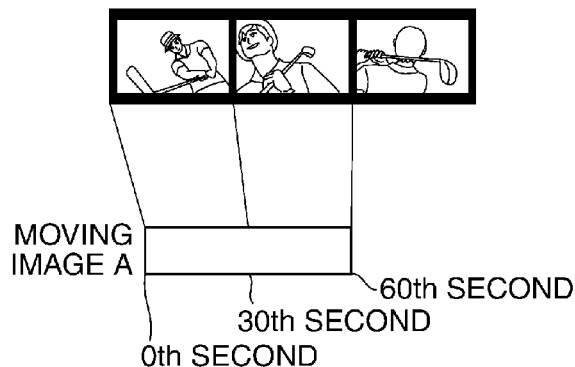
FIGS. 4A to 4C are diagrams showing a relationship between frame images to be selected and a moving image.
Figure 4B:
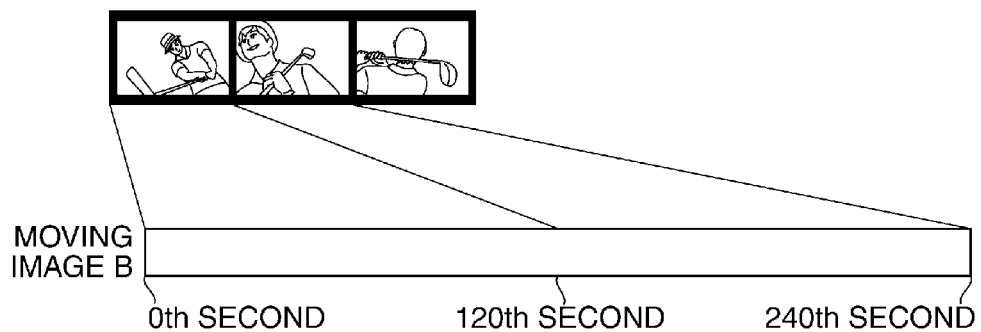
Figure 4C:
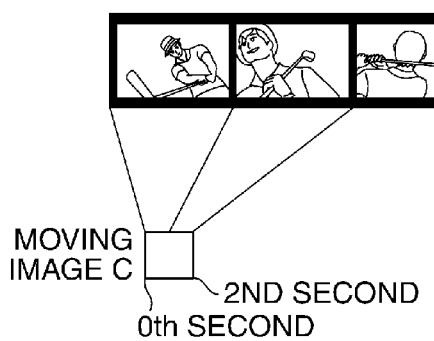

Next, a description will be given of a method of extracting frame images with reference to FIGS. 4A to 4C. FIGS. 4A to 4C are diagrams showing relationships between frame images to be selected and associated moving images.

FIG. 4A shows a moving image of which the playback time is 60 seconds long, by way of example. In this case, when the index entry of the moving image is represented by three frame images as a result of a finger operation on the touch panel 205, respective frame images at the 0th, 30th, and 60th seconds are extracted from the 60-second moving image such that time intervals between the three frame images become equal to each other.

Further, FIG. 4B shows a moving image of which the playback time is 240 seconds long, by way of example. When the index entry of the moving image is indicated using three frame images, respective frame images at the 0th, 120th, and 240th seconds are extracted. Thus, when the playback time of a moving image is different, the positions of the frame images to be extracted are determined by equally dividing the whole moving image according to the number of frame images to be displayed.

Further, FIG. 4C shows a moving image of which the playback time is 2 seconds long, by way of example. Also in this case, respective frame images of the 0th, 1st, and 2nd seconds are extracted. The 0th second indicates a starting point of the moving image, and the 1st second indicates a point after 1 second from the starting point of the moving image. Then, the 2nd second indicates a point after 2 seconds from the starting point of the moving image, and corresponds to the last frame image of the moving image. In the present embodiment, the minimum time interval between frame images is 1 second, and the maximum 3 frame images is displayed by default.

Figure 6:
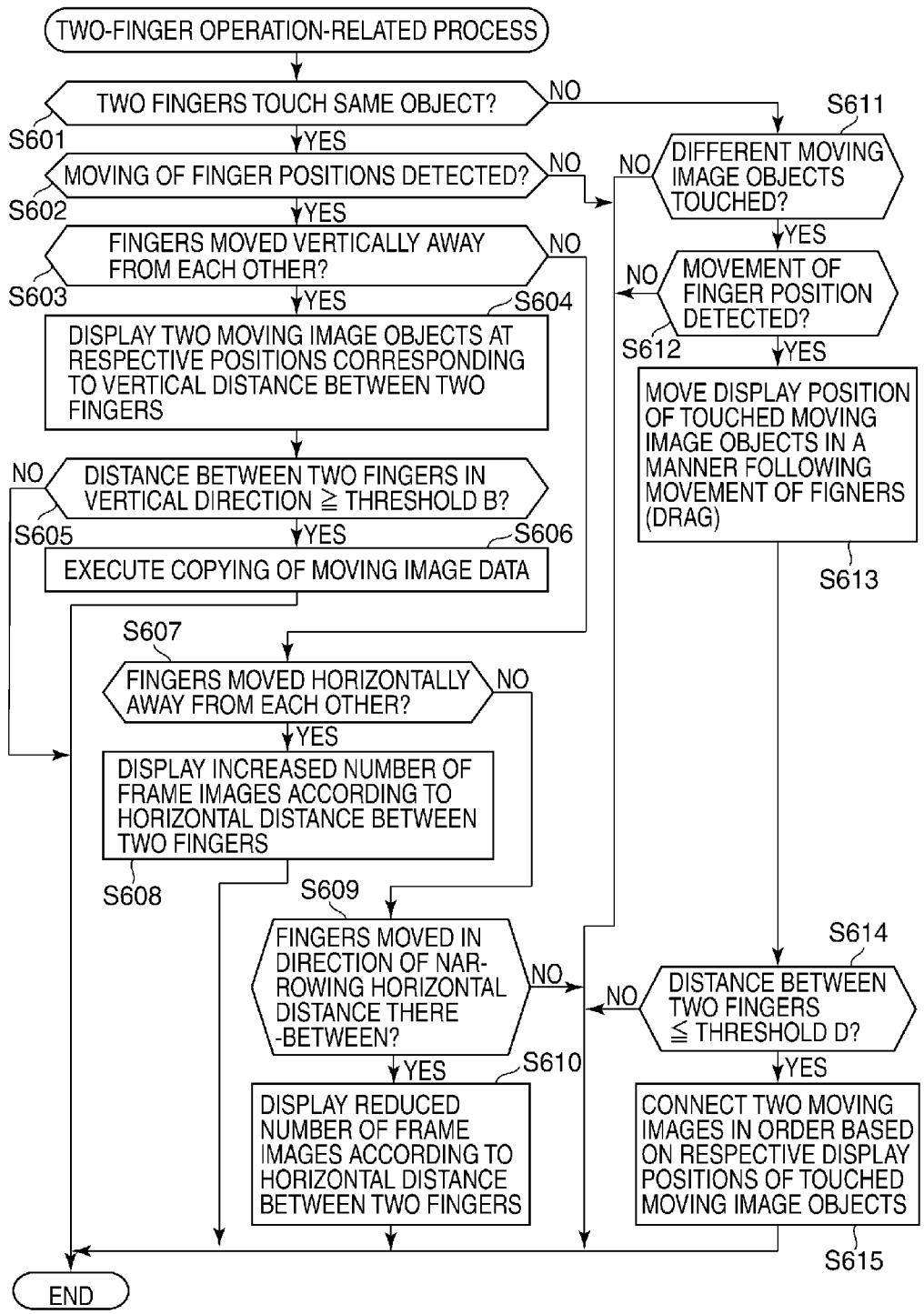
FIG. 6 is a flowchart of a two-finger operation-related process.
Figure 7:
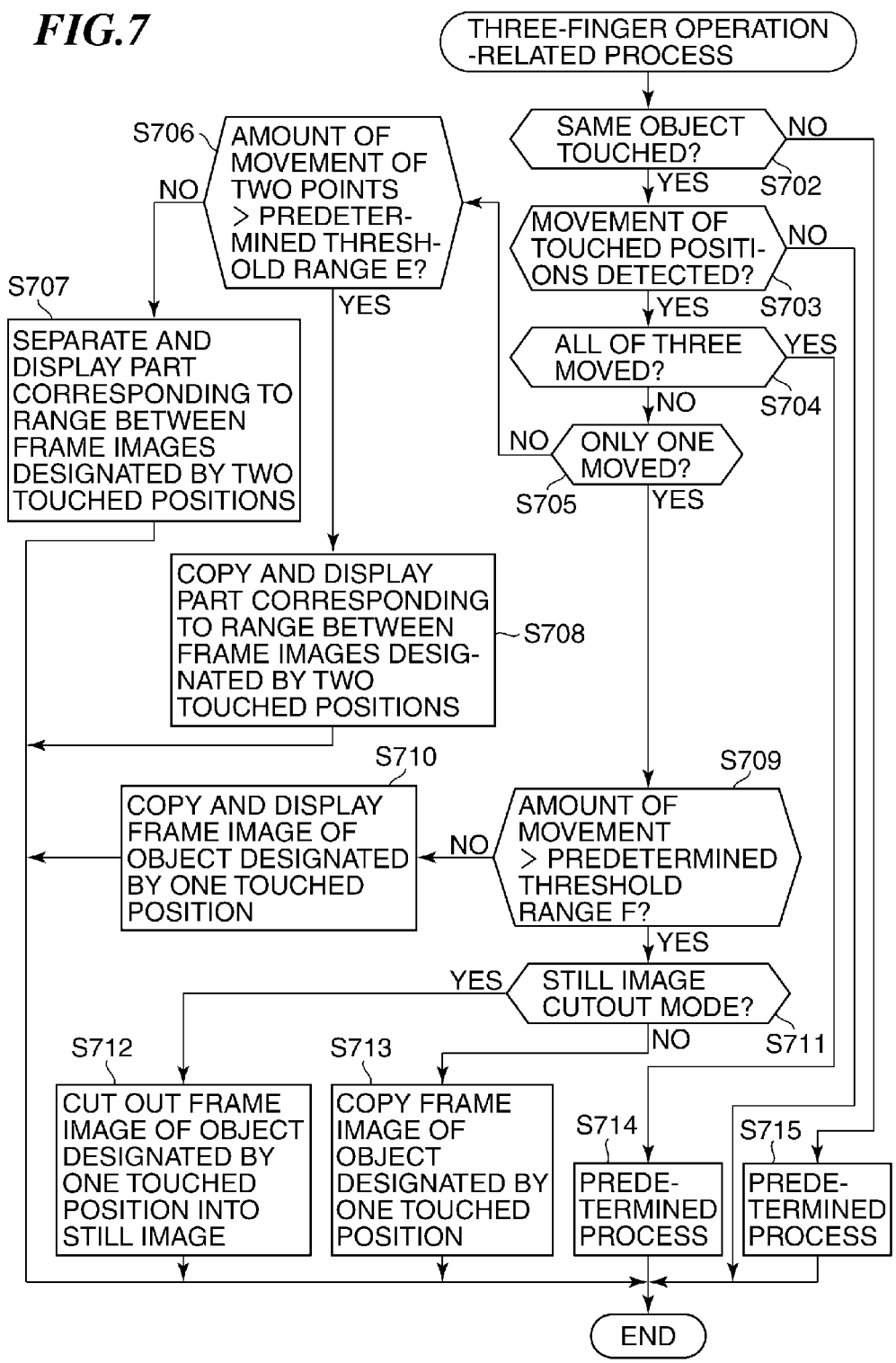
FIG. 7 is a flowchart of a three-finger operation-related process.

Next, a description will be given of the relationship between movement of fingers on the touch panel 205 and the sequence of the system with reference to flowcharts in FIGS. 5 to 7. It should be noted that the process of each of the flowcharts shown in FIGS. 5 to 7 is executed by the CPU 121 loading an associated program stored in the ROM 122 into the RAM 123.

Figure 5:
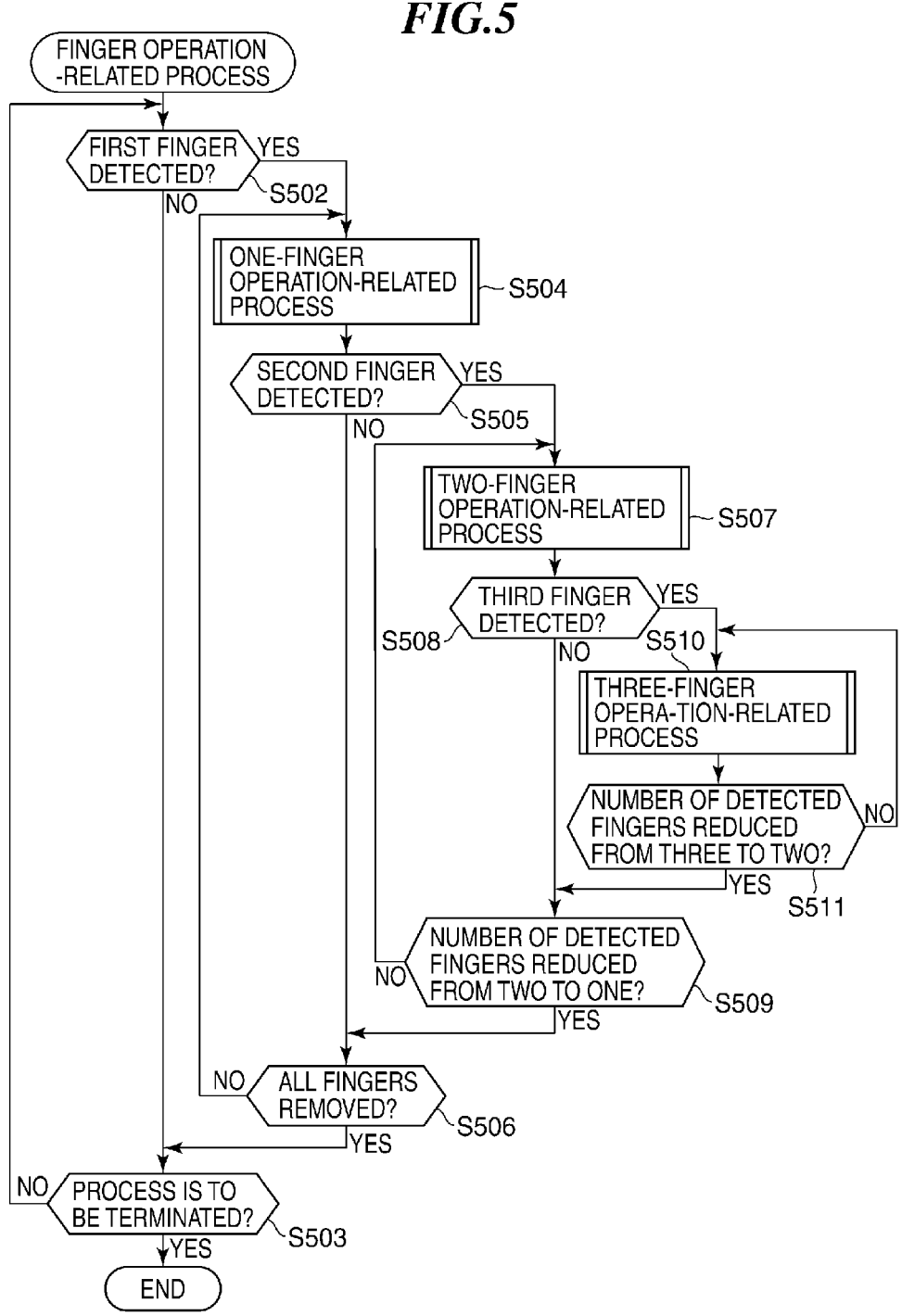
FIG. 5 is a flowchart of a finger operation-related process.

FIG. 5 is a flowchart of a finger operation-related process in the present embodiment. First, in a step S502, the touch state-detecting section 113 determines whether or not a first finger touch is detected. It should be noted that in the present embodiment, a touch on one point on the touch panel 205 is referred to as a first finger touch. Further, regardless of whether or not the first touch is actually made by a finger, if any contact(s) (touch(es)) is(are) simultaneously detected at one position (one point) on the touch panel 205, the answer to the question of the step S502 is affirmative (YES).

If it is determined in the step S502 that a first finger touch is not detected, the process proceeds to a step S503. Then, in the step S503, the overall controller 114 determines whether or not the present finger operation-related process is to be terminated. Here, cases where the present finger operation-related process is to be terminated include a case where the power of the digital camera 101 is turned off, and a case where an instruction for switching to another mode, such as a shooting mode, is given. If it is determined in the step S503 that the present finger operation-related process is to be terminated, the present finger operation-related process is immediately terminated. On the other hand, if it is determined in the step in the step S503 that the present finger operation-related process is to be continued, the process returns to the step S502.

On the other hand, if it is determined in the step S502 that a first finger touch is detected, the process proceeds to a step S504, wherein a one-finger operation-related process as a subroutine is executed by the control of the overall controller 114. Here, the one-finger operation-related process is intended to mean e.g. an operation for selecting an object touched by a finger on the screen. Next, in a step S505, the touch state-detecting section 113 determines whether or not a second finger touch is detected in a state in which the first finger touch is continued. Also in this case, although referred to as the second finger touch, regardless of whether or not each touch is actually made by a finger, if any contacts (touches) are simultaneously detected at two positions (two points) on the touch panel 205, the answer to the question of the step S505 is affirmative (YES).

If it is determined in the step S505 that a second finger touch is not detected, the process proceeds to a step S506, wherein the touch state-detecting section 113 determines whether or not all fingers are removed from the touch panel 205. If it is determined in the step S506 that all fingers are removed from the touch panel 205, the process proceeds to the step S503, whereas if there is a finger which is not removed from the touch panel 205, the process returns to the step S504.

On the other hand, if it is determined in the step S505 that a second finger touch is detected, the process proceeds to a step S507, wherein a two-finger operation-related process as a subroutine is executed. The two-finger operation-related process will be described hereinafter with reference to FIG. 6. Next, in a step S508, the touch state-detecting section 113 determines whether or not a third finger touch is detected in a state in which the first and second finger touches are continued. Also in this case, although referred to as the third finger touch, regardless of whether or not the third touch is actually made by a finger, if any contacts (touches) are simultaneously detected at three positions (three points) on the touch panel 205, the answer to the question of the step S508 is affirmative (YES).

If it is determined in the step S508 that a third finger touch is not detected, the process proceeds to a step S509, wherein the touch state-detecting section 113 identifies the number of detected fingers, and determines whether or not the number of fingers is reduced from two to one. If it is determined in the step S509 that the number of fingers is reduced from two to one, the process proceeds to the step S506, whereas if the number of fingers is not reduced, the process returns to the step S507.

On the other hand, if it is determined in the step S508 that a third finger touch is detected, the process proceeds to a step S510. Then, in the step S510, a three-finger operation-related process as a subroutine is performed. The three-finger operation-related process will be described hereinafter with reference to FIG. 7. Next, in a step S511, the touch state-detecting section 113 identifies the number of detected fingers, and determines whether or not the number of fingers is reduced from three to two. If it is determined in the step S511 that the number of fingers is reduced from three to two, the process proceeds to the step S509, whereas if it is determined that the number of fingers is not reduced, the process returns to the step S510. As described above, in the present embodiment, the device is operated while changing between the subroutines of the finger operation-related process according to the number of detected fingers.

FIG. 6 is a flowchart of the two-finger operation-related process executed in the step S507 in FIG. 5.

First, in a step S601, the touch state-detecting section 113 functions as a first determination unit, and determines whether or not the detected two fingers are touching the same moving image object. In this process, when the moving image object is formed by a plurality of frame images, it is determined whether or not the two fingers are touching any of these frame images. If it is determined in the step S601 that the two fingers are touching the same moving image object, the process proceeds to a step S602, whereas if it is determined that the two fingers are not touching the same moving image object, the process proceeds to a step S611.

In the step S602, the touch state-detecting section 113 determines whether or not the touched positions are moved without cancelling the touching by the detected two fingers. If it is determined in the step S602 that the touched positions are moved, the process proceeds to a step S603, whereas if it is determined that the touched positions are not moved, the present subroutine (the two-finger operation-related process) is terminated, and the process proceeds to the step S508 in FIG. 5.

In the step S603, it is determined whether or not the positions being touched by the two fingers are moved away from each other in a vertical direction as a result of the movement detected in the step S602. In the present embodiment, it is assumed that the longitudinal direction of the touch panel 205 is a left-right direction on the display screen (direction in which frame images are arranged in timeline display of a moving image object), and the vertical direction of the touch panel 205 is an up-down direction on the display screen (direction perpendicular to the direction in which frame images are arranged in timeline display of a moving image object). In this processing, the CPU 121 of the overall controller 114 performs the determination based on the detection by the touch state-detecting section 113, setting the vertical direction as the y-axis and the horizontal direction as the x-axis. That is, in the step S603, it is determined whether or not the positions being touched by the two fingers are moved away from each other in the y direction as a result of the movement, and if the touched positions are moved away from each other in the y direction by a distance corresponding to a predetermined threshold (this threshold is referred to as the threshold A), it is determined that the touched positions are moved away from each other in the y direction due to the movement of the fingers. If it is determined in the step S603 that the touched positions are moved away from each other in the y direction, the process proceeds to a step S604, whereas if it is determined that the touched positions are not moved away from each other in the y direction, the process proceeds to a step S607.

Figure 8A:
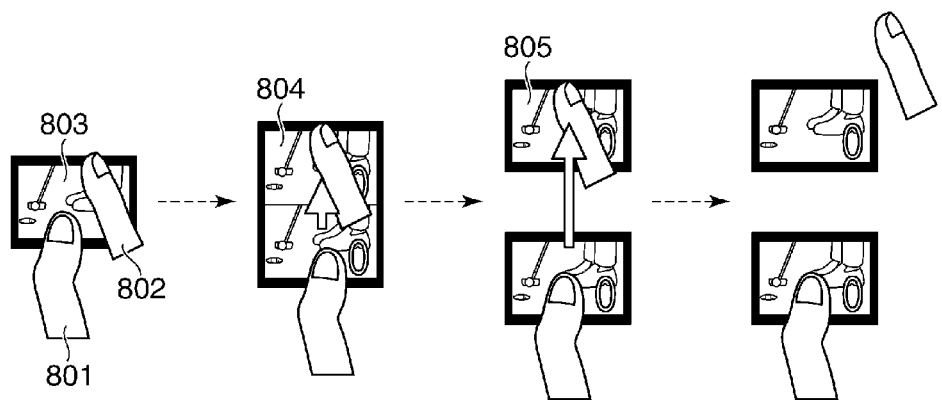
FIGS. 8A and 8B are views showing an example of a procedure for copying a moving image object.
Figure 8B:
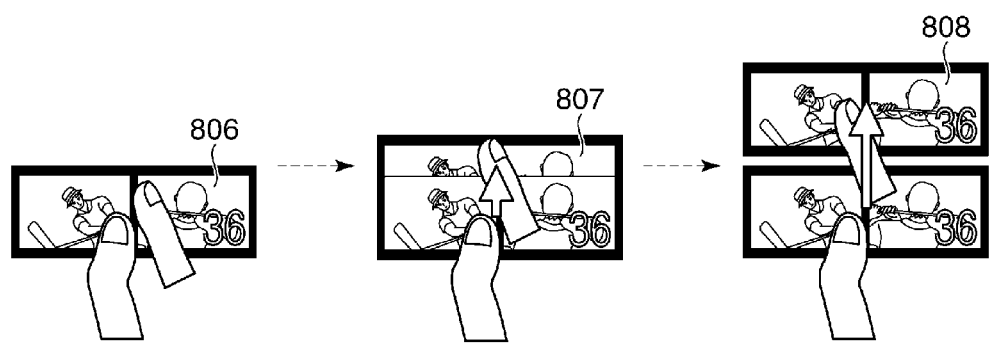

In the step S604, the overall controller 114 causes the synthesis section 107 to form a duplicate of the single moving image object being touched by the two fingers to thereby increase the number of the same moving image objects to two, and the moving image objects are displayed at positions on the touch panel 205 corresponding to the positions being touched by the two fingers. Here, it is assumed that if the distance between the positions being touched by the two fingers is not large enough to separate the moving image objects, the two moving image objects are displayed in an overlapping manner. FIGS. 8A and 8B show examples of this display, and details thereof will be described hereinafter.

Next, in a step S605, the overall controller 114 functions as a second determination unit, and determines based on the detection by the touch state-detecting section 113 whether or not the distance between the two positions being touched by the two fingers in the vertical direction after moving the fingers has become equal to or larger than a threshold B (not smaller than a predetermined value). If it is determined in the step S605 that the distance has become equal to or larger than the threshold B, the process proceeds to a step S606, whereas if it is determined that the distance is smaller than the threshold B, the present subroutine (the two-finger operation-related process) is terminated, and the process proceeds to the step S508 in FIG. 5.

In the step S606, the actual moving image data item represented by the moving image object being touched by the two fingers is copied. That is, the overall controller 114 duplicates the moving image data item indicated by the moving image object being touched by the two fingers in the step S601, and stores the duplicated moving image data item in the storage medium 120. The range of the moving image data item duplicated at this time corresponds to the entirety of the moving image before duplication. It should be noted that it is not necessary to execute the operations of duplicating the moving image data item and storing the duplicated moving image data item in the storage medium 120 in this timing, but an identifier of the moving image data item to be duplicated and an instruction for duplicating the moving image data item may be held in the RAM 123 so as to control the execution of the duplication and storage, and processing for the duplication and storage may be executed afterwards. As the timing in which the processing for duplication and storage is executed, the following timings can be envisaged: timing in which a user's instruction for the execution is given by e.g. depressing an execution button (including a collective execution button), not shown; timing in which an instruction for terminating the application software for executing the present subroutine or operating another task is given; and a vacant time in which no tasks are being executed. As described above, only by performing the operations of touching the same moving image object by the two fingers and moving the touching two fingers away from each other in the vertical direction, it is possible to easily copy the moving image data item represented by the moving image object being touched by the user. After execution of the step S606, the present subroutine is terminated, and the process proceeds to the step S508 in FIG. 5.

On the other hand, in the step S607, the overall controller 114, which functions as the second determination unit, determines based on the detection by the touch state-detecting section 113 whether the two positions being touched by the two fingers are moved away from each other in the horizontal direction (x direction) due to the movement of the touched positions detected in the step S602. At this time, on condition that the distance between the touched positions in the x direction becomes equal to or larger than a predetermined threshold (threshold C), it is determined that the touched positions are moved away from each other in the x direction due to the movement. If it is determined in the step S607 that the touched positions are moved away from each other in the horizontal direction, the process proceeds to a step S608, whereas if it is determined that the touched positions are not moved away from each other in the horizontal direction, the process proceeds to a step S609.

Figure 11A:
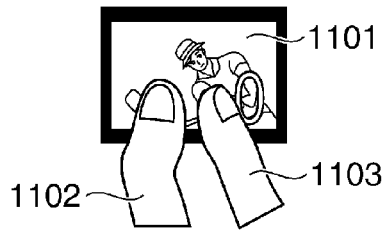
FIGS. 11A to 11C are views showing an example of displays in which the size of a moving image object in timeline display is increased.
Figure 11B:
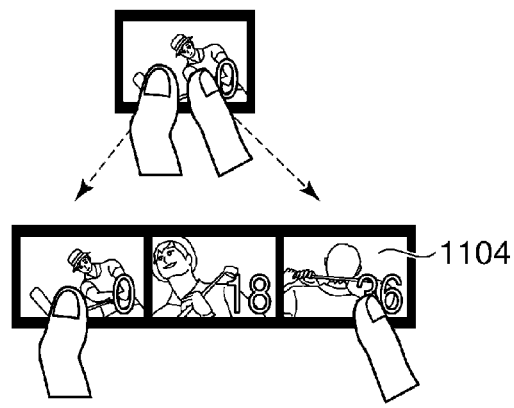
Figure 11C:
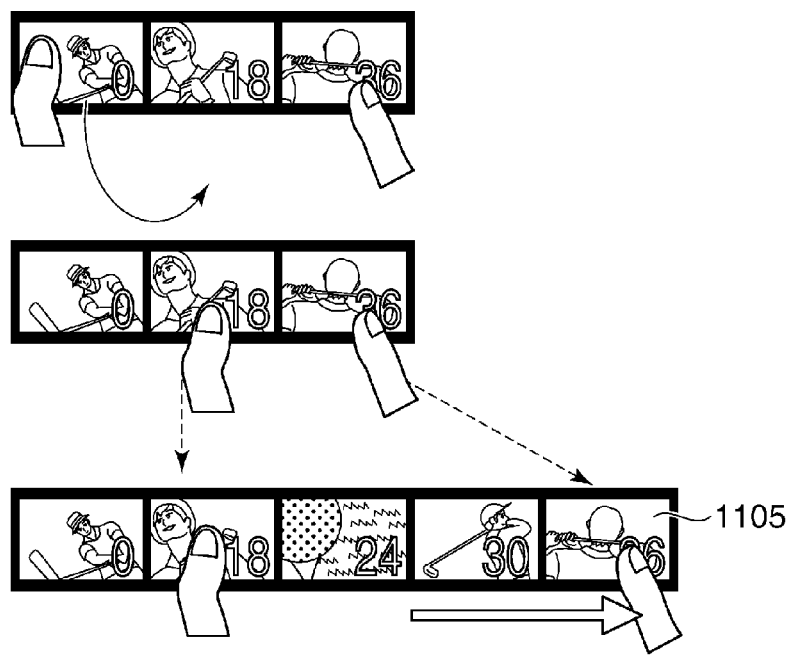

In the step S608, the overall controller 114 determines the number of frame images to be displayed in timeline display according to the distance between the two fingers in the horizontal direction. Then, the frame image-extracting section 106 extracts the determined number of frame images from the moving image data item represented by the touched moving image object, and the synthesis section 107 displays the frame images on the touch panel 205 in a manner arranged in the x direction. In doing this, if two or more frame images are displayed in timeline display of the moving image object and at the same time the frame images being touched by the two fingers are different, one or more frame images between the two touched frame images are displayed. Further, if only one frame image is displayed in timeline display of the moving image object, frame images between the first frame and the last frame of the moving image data item represented by the moving image object are extracted and displayed. That is, only by performing the operations of touching the same moving image object by two fingers and moving the touching two fingers away from each other in the horizontal direction, it is possible to switch the timeline display of a range of a moving image desired by the user to a more detailed display. FIGS. 11A to 11C show an example of the display at this time, and details of FIGS. 11A to 11C will be described hereinafter. Then, after execution of the step S608, the present subroutine (the two-finger operation-related process) is terminated, and then the process proceeds to the step S508 in FIG. 5.

On the other hand, in the step S609, the overall controller 114, which functions as the second determination unit, determines based on the detection by the touch state-detecting section 113 whether or not the distance in the horizontal direction (x direction) between the two positions being touched by the two fingers is made smaller than before the movement of the touched positions detected in the step S602. If it is determined in the step S609 that the distance in the horizontal direction is made smaller, the process proceeds to a step S610, whereas if it is determined that the distance is not made smaller, the present subroutine (the two-finger operation-related process) is terminated, and then the process proceeds to the step S508 in FIG. 5.

In the step S610, the overall controller 114 reduces the number of frame images displayed in timeline display according to the distance between the two fingers in the horizontal direction, and the synthesis section 107 reduces the length of the area displaying the touched moving image object in the horizontal direction. More specifically, the number of frame images to be displayed in timeline display is determined according to the distance between the two fingers in the horizontal direction, and the determined number of frame images are extracted from the moving image data item represented by the touched moving image object, and are displayed in a manner arranged in the x direction. In doing this, since the distance between the two fingers in the horizontal direction is reduced, the number of extracted frame images is made smaller than before the distance is reduced.

Figure 13A:
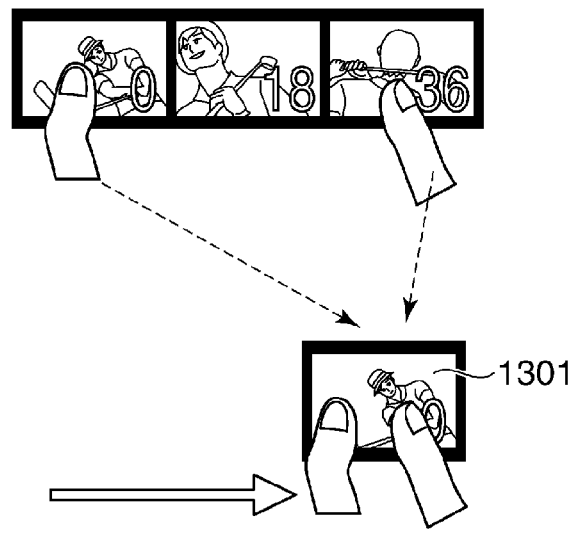
FIGS. 13A and 13B are views showing an example of displays in which the size of a moving image object in timeline display is reduced.
Figure 13B:
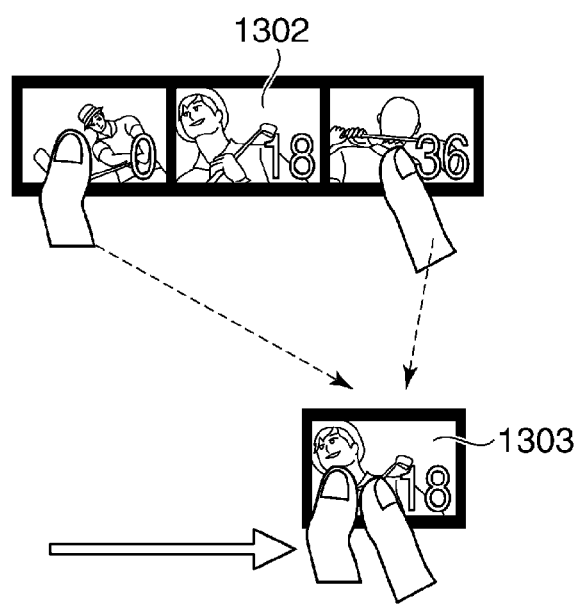

Now, there is a case where before reducing the distance between the two touching fingers, two or frame images are displayed in timeline display of the touched moving image object, and the two fingers touch different image frames, respectively. In this case, as the distance between the two fingers in the horizontal direction is reduced, only the number of frame images between the two touched frame images is reduced. This makes it possible to switch the timeline display of a range of a moving image desired by the user to a simpler one, and narrow the display area only by performing the operations of touching the same moving image object by two fingers and reducing the distance between the two touching fingers in the horizontal direction. FIGS. 13A and 13B show an example of the display at this time. Details of FIGS. 13A and 13B will be described hereinafter. After execution of the step S610, the present subroutine is terminated, and the process proceeds to the step S508 in FIG. 5.

On the other hand, in the step S611, the touch state-detecting section 113, which functions as the first determination unit, determines whether or not the detected two fingers are touching different moving image objects, respectively. If it is determined in the step S611 that the detected two fingers are touching different moving image objects, respectively, the process proceeds to a step S612, whereas if it is determined that the detected two fingers are not touching different moving image objects, respectively, the present subroutine is terminated, and the process proceeds to the step S508 in FIG. 5.

In the step S612, the touch state-detecting section 113 determines whether or not the touched positions are moved without cancelling the touching by the two fingers. If it is determined in the step S612 that the touched positions are moved, the process proceeds to a step S613, whereas if it is determined that the touched positions are not moved, the present subroutine is terminated, and then the process proceeds to the step S508 in FIG. 5.

In the step S613, the overall controller 114, which functions as a position change control unit, causes the synthesis section 107 to move the display positions of the touched moving image objects in a manner following the movement of the positions being touched by the fingers. That is, the synthesis section 107 accepts drag of the moving image objects.

Next, in a step S614, the overall controller 114, which functions as the second determination unit, determines based on the detection by the touch state-detecting section 113 whether or not the distance between the positions being touched by the two fingers has become equal to or smaller than a threshold D (not larger than a predetermined value) due to the movement of the fingers. If it is determined in the step S614 that the distance becomes equal to or smaller than the threshold D, the process proceeds to a step S615, whereas if it is determined that the distance is more than the threshold D, the present subroutine is terminated, and then the process proceeds to the step S508 in FIG. 5.

Figure 14:
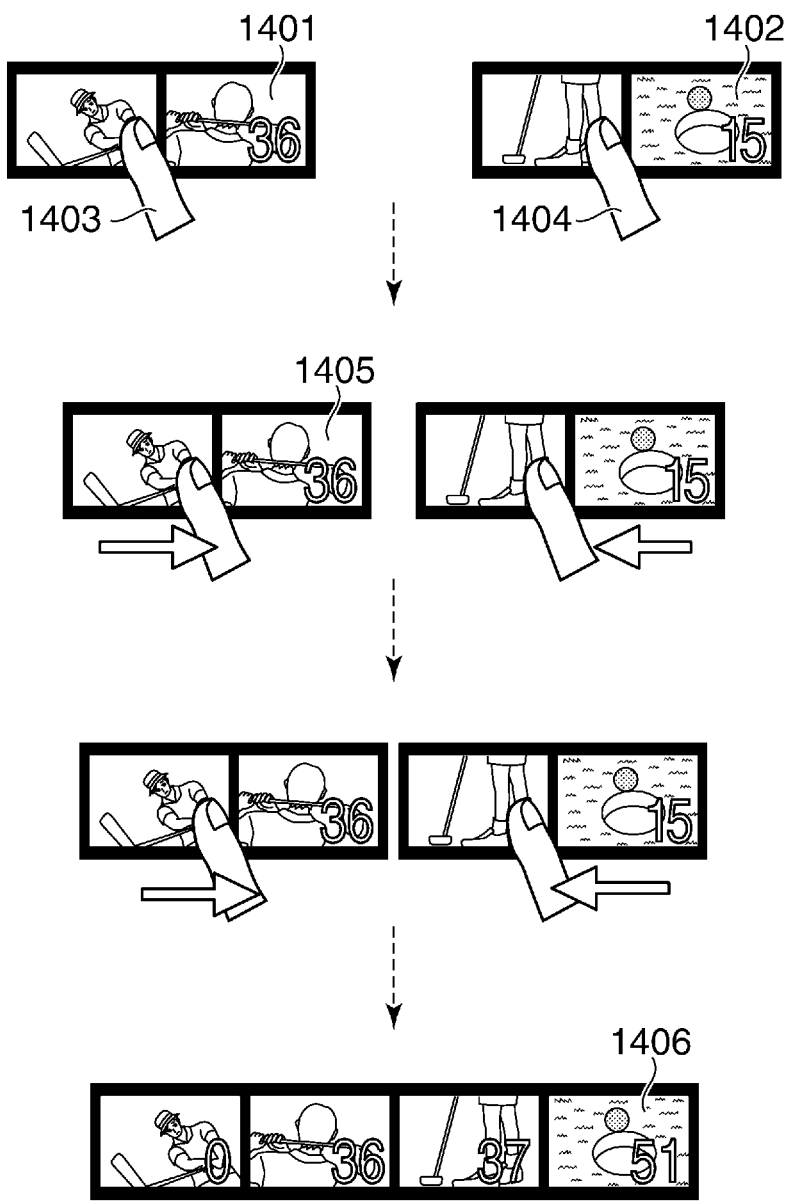
FIG. 14 is a view showing an example of a method of connecting a plurality of moving image objects.
Figure 15:
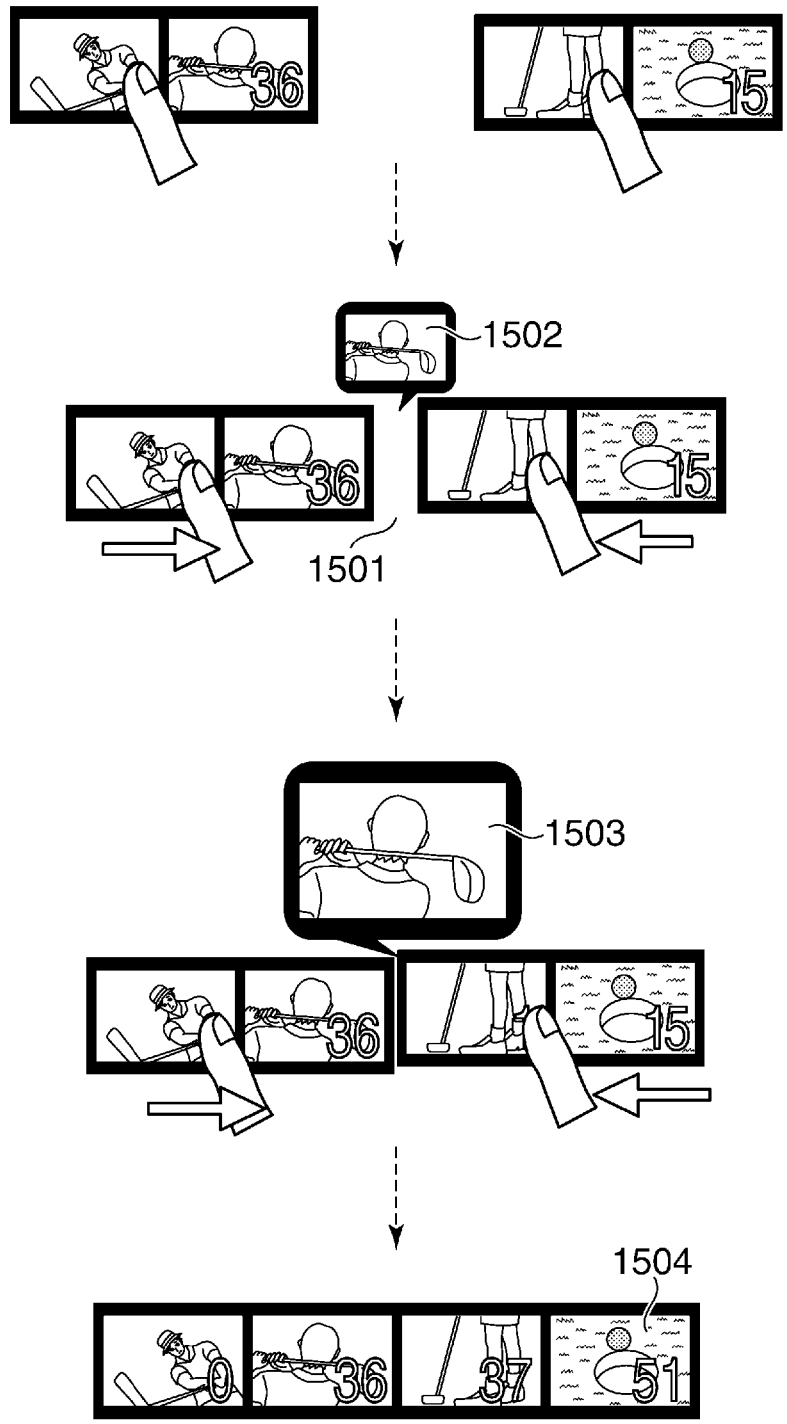
FIG. 15 is a view showing an example of a display effect added when connecting moving image objects.
Figure 16:
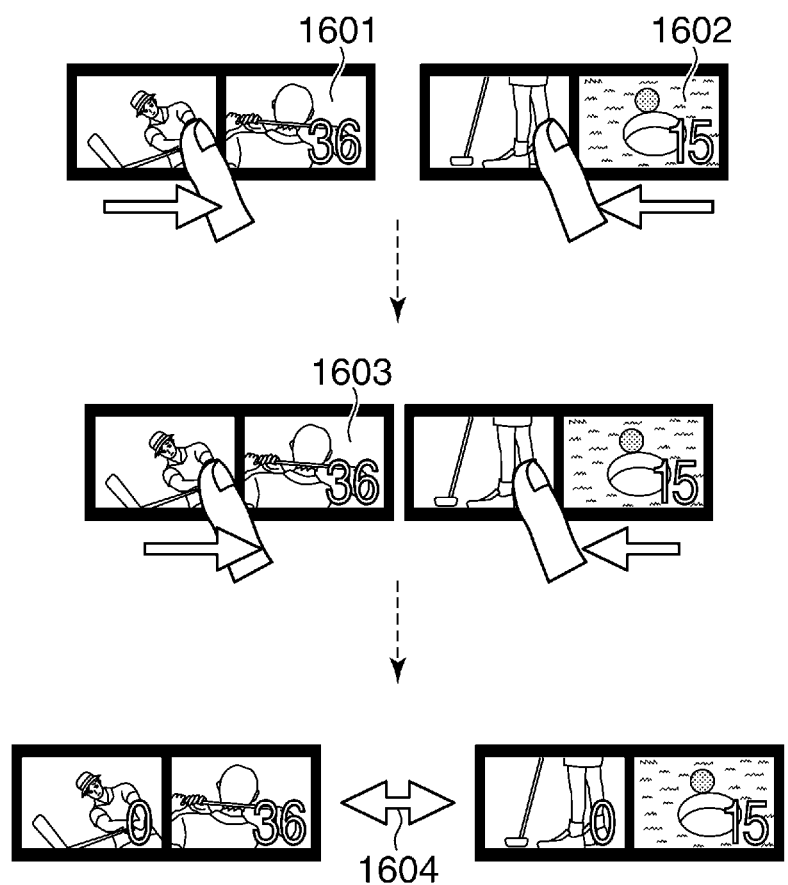
FIG. 16 is a view showing an example of displays in a case where moving image objects cannot be connected to each other.

In the step S615, the overall controller 114 causes the moving image data item represented by the two different moving image objects being touched by the two fingers to be connected. In doing this, on the touch panel 205, based on the respective display positions of the two moving image objects, the synthesis section 107 causes the two moving image objects to be displayed such that one moving image object on the left side and the other moving image object on the right side are continuous with each other, and are surrounded with one black frame. Actually, image data items represented by the respective moving image objects are combined into one connected moving image data item such that subsequent to the last frame of the moving image represented by the moving image object on the left side, the first frame of the moving image represented by the other moving image object on the right side is played back, thereby enabling the whole moving image of the connected moving image data item to be continuously played back. Then, the storage medium access section 111 stores the newly produced moving image data item in the storage medium 120. This makes it possible to easily connect desired moving images in the desired order only by simultaneously touching moving image objects which the user desires to connect, out of a plurality of displayed moving image objects, and moving the touched moving image objects closer to each other. Further, FIGS. 14 to 16 show examples of the display at this time. Details of FIGS. 14 to 16 will be described hereinafter. It should be noted that it is not necessary to execute the connection processing (combining the two image data items into the new connected image data item which can be continuously played back, and storing the new moving image data item in the storage medium 120) per se in this timing. The connection processing may be executed afterwards, but in the present timing, respective identifiers of the moving image data items to be connected to each other, an instruction for connecting them, and an order in which they are connected may be stored in the RAM 123, and the connection processing may be executed afterwards. As the timing in which the connecting processing is executed, the following timings can be envisaged: timing in which a user's instruction for execution is given by e.g. depressing an execution button (including a collective execution button), not shown; timing in which an instruction for terminating the application software for executing the present subroutine or operating another task is given; and a vacant time in which no tasks are being executed. After executing the step S606, as described above, the present subroutine is terminated, and the process proceeds to the step S508 in FIG. 5.

According to the above control, by the operation of touching the moving image objects displayed on the touch panel 205, it is possible to intuitively, easily and immediately perform the operations of confirming, copying, and connecting the contents of moving images using the time line display.

Next, a description will be given of the three-finger operation-related process executed in the step S510 in FIG. 5 with reference to FIG. 7. FIG. 7 is a flowchart of the three-finger operation-related process.

First, in a step S702, the touch state-detecting section 113, which functions as the first determination unit, determines whether or not the detected three fingers are touching the same moving image object. If it is determined in the step S702 that the same moving image object is being touched, the process proceeds to a step S703, whereas if it is determined that the same moving image object is not being touched, the process proceeds to a step S715. It should be noted that in the step S715, a predetermined process for a case where the same moving image object is not being touched is executed. As for the predetermined process in this case, regarding that it is not possible to specify any moving image object, nothing may be executed. Since the illustrated example is intended for giving a description of cases where the operation is performed when the same moving image object is touched for operation, detailed description of the step S715 is omitted.

In the step S703, the touch state-detecting section 113 monitors positions (contact positions) of where the fingers are touching the screen to thereby determine whether or not the touched positions are moved. If it is determined in the step S703 that the touched positions are moved, the process proceeds to a step S704, whereas if it is determined that the touched positions are not moved, the present subroutine (the three-finger operation-related process) is terminated, and the process proceeds to the step S511 in FIG. 5.

In the step S704, the touch state-detecting section 113, which functions as the second determination unit, counts the number of moved fingers to determine whether or not all of the three fingers are moved. If it is determined in the step S704 that all of the three fingers are moved, the process proceeds to a step S714, whereas if it is determined that the number of the moved fingers is two or less, the process proceeds to a step S705. In the step S714, a predetermined process for a case where all of the three fingers are moved is executed. As the predetermined process in this case, regarding that it is not possible to specify an instruction to be given concerning the moving image object, nothing may be executed. The illustrated example is intended for giving a description of the case where the three fingers are moved, detailed description of the step S714 is omitted.

In the step S705, the touch state-detecting section 113 determines, based on the result of counting, whether or not only one finger is moved. If it is determined in the step S705 that only one finger is moved, the process proceeds to a step S709, whereas if two fingers are moved, the process proceeds to a step S706.

In the step S706, the overall controller 114 determines based on the result of detection by the touch state-detecting section 113 whether or not the amount of movement of the two fingers is larger than a predetermined threshold E. If it is determined in the step S706 that the amount is larger than the predetermined threshold range E, the process proceeds to a step S708, whereas if it is determined that the amount is not larger than the predetermined threshold range E, the process proceeds to a step S707. In the step S707, the overall controller 114 causes the synthesis section 107 to separate part corresponding to a range of the moving image data item between the frame images designated by the two fingers and display the same as a new moving image object. Then, the present subroutine is terminated, and the process proceeds to the step S511 in FIG. 5. On the other hand, in the step S708, the overall controller 114 causes part of the moving image data item corresponding to the range between the frame images designated respectively by the two fingers to be copied. Then, the present subroutine is terminated, and the process proceeds to the step S511 in FIG. 5.

In the step S709, the overall controller 114 determines based on the result of detection by the touch state-detecting section 113 whether or not the amount of movement of the one finger is larger than a predetermined threshold F. If it is determined in the step S709 that the amount is larger than the predetermined threshold F, the process proceeds to a step S711, whereas if it is determined that the amount is not larger than the predetermined threshold range F, the process proceeds to a step S710. In the step S710, the overall controller 114 causes part of the moving image data item corresponding to the frame image of the object designated by one point to be copied and display the frame image as a display object. At this time, a preview display to the effect notifying that a still image is going to be cut out may be performed. Then, the present subroutine is terminated, and then the process proceeds to the step S511 in FIG. 5.

On the other hand, in the step S711, it is determined whether or not the overall controller 114 has set the current mode to a still image cutout mode. If it is determined in the step S711 that the current mode is the still image cutout mode, the process proceeds to a step S712, whereas if it is determined that the current mode is another mode, the process proceeds to a step S713. In the step S712, the overall controller 114 causes the frame image designated with the one finger to be cut out into a still image. Then, the present subroutine is terminated, and then the process proceeds to the step S511 in FIG. 5. On the other hand, in the step S713, the overall controller 114 causes part of the moving image corresponding to the frame image designated with the one finger to be copied. Then, the present subroutine is terminated and then the process proceeds to the step S511 in FIG. 5.

Next, a description will be given of a method of actually performing the copy operation. FIGS. 8A and 8B are views showing an example of a procedure for selecting one moving image object as an object to be copied, out of objects displayed as index entries in FIG. 3, and copying the selected moving image object in the step S606 in FIG. 6.

FIG. 8A shows an operation in which a moving image object 803 representing a moving image content (moving image data item) by one thumbnail as an index entry is touched by two fingers, i.e. a thumb 801 and a forefinger 802, and the distance between the two fingers is increased. As a result, a thumbnail 804 of the copied moving image object is displayed. If the fingers are removed at this point, the moving image data item is not copied, whereas if the fingers are removed in a state in which the distance between the thumb 801 and the forefinger 802 exceeds the above-mentioned threshold B, a thumbnail 805 separated from the thumbnail of the original moving image object 803 is formed, whereby the moving image data item is copied.

Further, as shown in FIG. 8B, also in a case of a moving image object which represents a moving image data item as an index entry by a plurality of thumbnails, the copy operation is similarly performed. When a moving image object 806 formed by two thumbnails is touched and is spread by the fingers, a overlapping moving image object 807 is created, and further, a completely separated moving image object 808 is created. At this time, the moving image data item is copied.

Figure 9A:
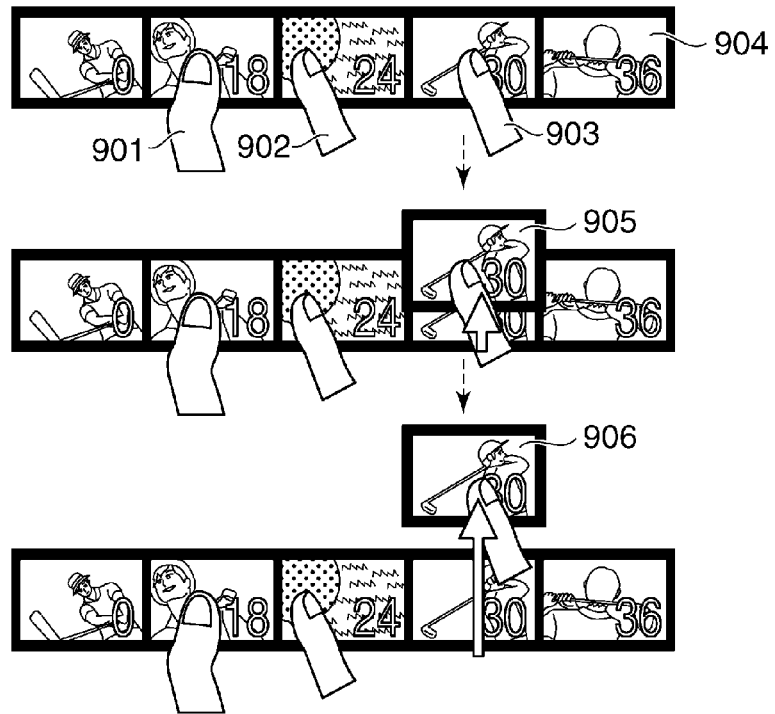
FIGS. 9A and 9B are views showing an example of a procedure for copying a specified range of a moving image content.
Figure 9B:
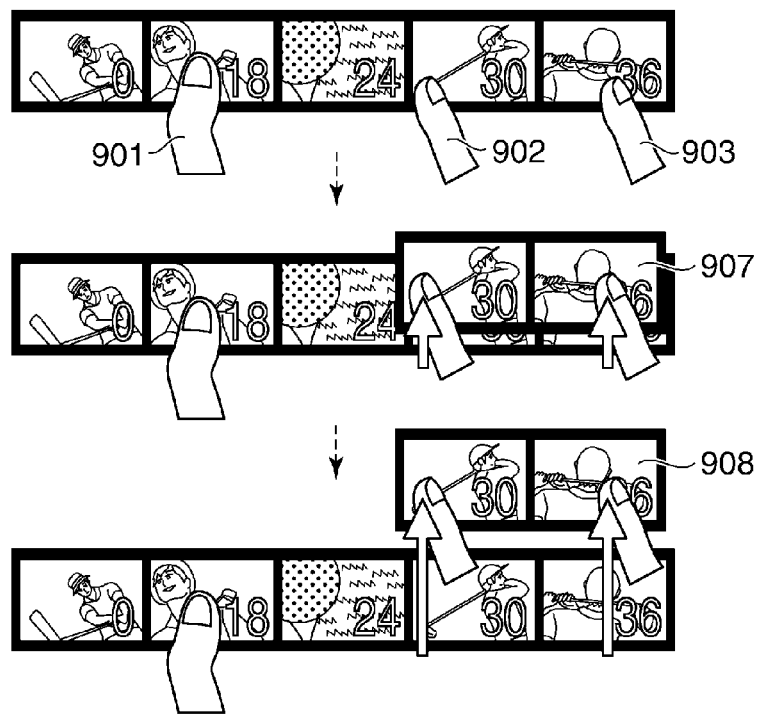

Next, a description will be given of an operation for copying a range of a moving image data item by specifying the range. FIGS. 9A and 9B are views showing an example of a procedure for copying a specified range of a moving image content (moving image data item) using three fingers.

FIG. 9A shows an example of operations for selecting part of a moving image object formed by a plurality of thumbnails, and then cutting out the selected part as a still image or copying part of the moving image in an associated one of the steps S710, S712, and S713 in FIG. 7. As shown in FIG. 9A, a moving image object 904 is touched by three fingers, i.e. a left thumb 901, a right forefinger 902, and a right middle finger 903.

When only the right middle finger 903 is moved upward on the screen of the touch panel 205 in this state, a thumbnail 905 touched with the right middle finger 903 is displayed in a manner separating from the moving image object. When the right middle finger 903 is further slid upward, a thumbnail 906 completely separated from the moving image object is formed. At this time, a section of the moving image data item corresponding to the thumbnail touched by the right middle finger 903 is copied. It may be configured that the part of the thumbnail 906 is cut out from the moving image data as a still image by this operation.

FIG. 9B shows a state in which the left thumb 901 holds a moving image object and the right two fingers 902 and 903 are moved in the steps S707 and S708 in FIG. 7. In this state, the right forefinger and middle finger 902 and 903 designate respective thumbnails of the moving image object to thereby designate a section of the moving image data item. When the forefinger and the middle finger 902 and 903 are displaced in parallel in a manner slid upward on the touch panel 205, thumbnails 907 corresponding to the specified section of the moving image object are moved with the fingers 902 and 903, and then are completely separated from the moving image object. Then, when the fingers 902 and 903 are further slid, the specified section of the moving image data item, corresponding to an area 908, is copied.

Figure 10:
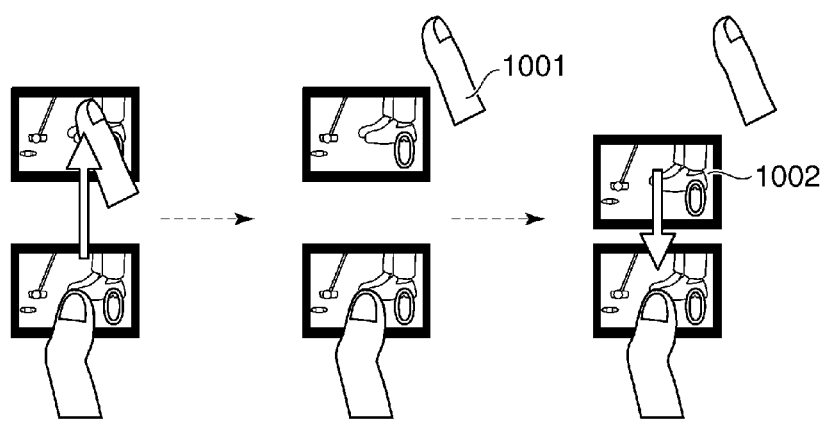
FIG. 10 is a view showing an example of displays in a case where copy cannot be executed.

Next, a description will be given of processing when a moving image object which cannot be copied is selected, with reference to FIG. 10. FIG. 10 is a view showing an example of a state in which a moving image object which cannot be copied is selected and the copy operation is attempted to be performed.

As described above, in the case of an object which can be copied, the copy operation on the screen is completed when a thumbnail or thumbnails is/are separated from the moving image object to form a new moving image object. However, in the case of an object which cannot be copied, as shown in FIG. 10, when a forefinger 1001 is removed from the touch panel 205, a thumbnail 1002 having been touched by the forefinger 1001 operates to return to its original state. Thus, the thumbnail is automatically returned to the original state after the copy operation is displayed to the user as if it was halfway successful, which makes it possible to expressly notify the user that copy cannot be executed. At this time, a warning may be given by displaying a message saying that copy cannot be executed. Further, similarly, in the case of the operation for copying part of the moving image or cutting out a still image from the moving image object, as described with reference to FIGS. 9A and 9B, the thumbnail(s) is(are) returned to the original state after the copying operation or the operation for cutting out a still image is displayed to the user as if it was halfway successful. Further, a warning may be given by displaying a message saying that copy cannot be executed.

Next, a description will be given of operations performed on the timeline display of a moving image object with reference to FIGS. 11A to 11C. The following description will be given of an index entry 318 represented by a moving image object displayed on the display screen 310 of the touch panel 205 shown in FIG. 3, by way of example.

FIG. 11A shows an example of a method of selecting a moving image object for timeline display. By touching the moving image object 1101 by two fingers, i.e. a right thumb 1102 and a right forefinger 1103, it is possible to start timeline display of the moving image object 1101.

FIG. 11B shows an example of a method of performing timeline display in the step S608 in FIG. 6. When the touching two fingers as shown in FIG. 11A are slid on the touch panel 205 in a manner moved away from each other, the number of frame images is calculated according to the distance between the two fingers. Then, a timeline 1104 formed by frame images is displayed on the touch panel 205. In the illustrated example in FIG. 11B, three frame images are displayed according to the distance between the fingers.

FIG. 11C shows an example of performing further detailed timeline display of a specified section. When the user desires to see further details of the timeline between an 18th second and a 36th second from a state illustrated in FIG. 11B, the user once removes the right thumb 1102 from the touch panel 205, and then touches a frame image at the 18th second. If the fingers are spread in a direction away from each other while touching the touch panel 205, a timeline 1105 is displayed such that frame images between the 18th second and the 36th second are arranged at equally-spaced intervals as shown in FIG. 11C.

Figure 12A:
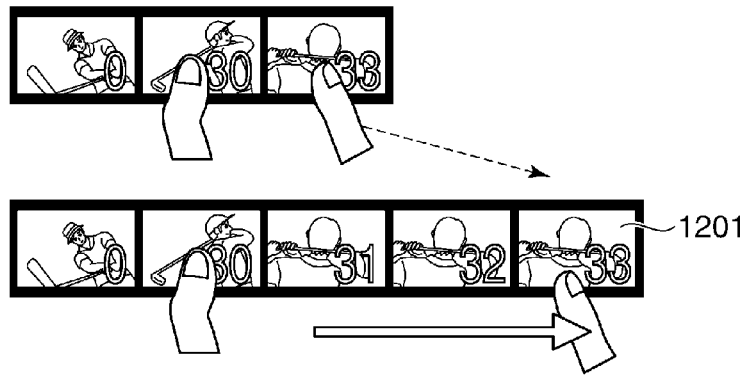
FIGS. 12A to 12C are views showing another example of displays in which the size of a moving image object in timeline display is increased.
Figure 12B:
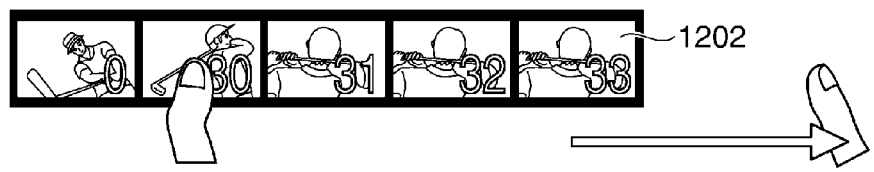
Figure 12C:
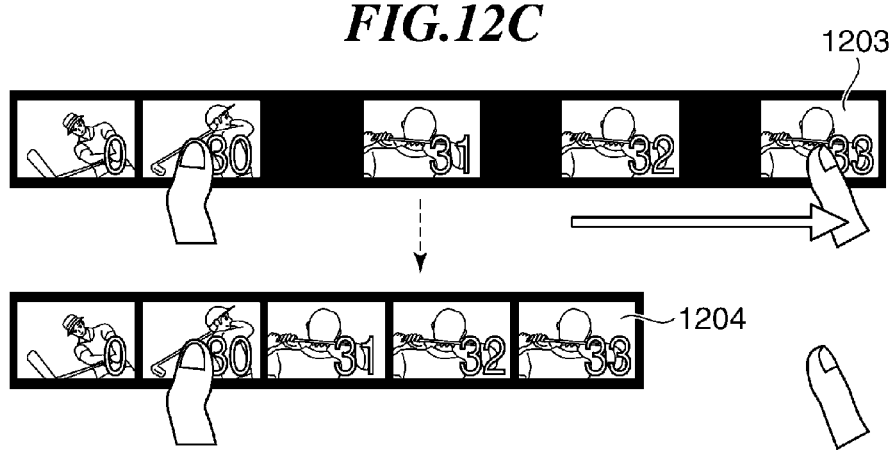

FIGS. 12A to 12C show an example of a display in a case where a moving image object is selected with two fingers and the fingers are spread too much. A timeline 1201 illustrated in FIG. 12A shows a state in which all of the frame images from a 30th second to a 33rd second of the moving image object are displayed, and even if the fingers are further spread, any more frame images cannot be displayed. Hereinafter, two manners of display executed when the fingers are further spread from this state will be described.

First is a case where a timeline 1202 remains in the same state but the frame images do not follow the movement of the touching finger, as shown in FIG. 12B. Since no frame images can be newly produced, no frame images are added. This enables the user to know that the timeline display of the moving image object has reached the limit.

Second is a case where frame images are moved in a manner following the position of the touching finger. In this case, although new frame images cannot be produced, a timeline 1203 is displayed in which intervals between the frame images between the fingers are increased. In this case, if the touching finger is removed from the touch panel 205, the display returns to a normal display in which the frame images are continuously displayed. Thus, by making the user aware that it is not possible to display any more frame images, the user can know the limit of the display.

FIGS. 13A and 13B show an example of a method of determining a frame image to be displayed when the moving image object of the index entry comes to be represented by one frame image, in the step S610 in FIG. 6. When fingers operating respective frame images of the moving image object are moved closer to each other, the moving image object comes to be represented by one frame image. The following description is given of two examples of the method of determining the one frame image to be displayed at this time.

First is a method illustrated in FIG. 13A in which one frame image 1301 of the moving image object representing the index entry is set to a leading frame image 1300. Second is a method illustrated in FIG. 13B in which one frame image 1303, which is set in advance as a representative image by the user, of the moving image object representing the index entry is set to a frame image 1302. In this case, the user may be allowed to register a desired frame image of the moving image data item as a frame image to be displayed as a representative of the moving image object when the moving image data item is played back or shown in index display. Further, in the case of digital cameras or the like, an image from which a most characteristic face is extracted may be used as a frame image for this use.

As described above, by setting an image designated by the user or the leading frame image of the moving image object as the image to be displayed when the frame images of the moving image is reduced to one, it is possible to make it easy to find a desired moving image from index entries of various moving images and still images.

FIG. 14 shows an example of a method of connecting a plurality of moving image objects into one index entry.

In FIG. 14, a moving image object 1401 on the left side and a moving image object 1402 on the right side are connected such that the former and the latter form the first half and second half of a moving image object representing a moving image data item formed by combining moving image data items represented by the moving image objects 1401 and 1402, respectively. A left forefinger 1403 and a right forefinger 1404 are moved closer to each other to thereby make the moving image objects designated by the respective fingers 1403 and 1404 closer to each other. When a distance 1405 between the moving image objects becomes smaller than a certain threshold, the moving image objects are connected into one moving image object 1406. At this time, the two moving image data items may be actually combined, or without combining the two moving image data items themselves, they may be connected only on a play list.

Further, when connecting index entries, a display effect may be added. As shown in FIG. 15, the two moving image objects designated by fingers are made closer to each other, and when the distance 1501 between the two moving image objects becomes smaller than a certain threshold, a preview image 1502 predicting connection of the two moving images is displayed. Further, the display size of the preview image 1502 changes according to the distance 1501 between the two moving image objects.

Further, immediately before the two moving image objects are connected, a larger preview image 1503 is displayed, and the moving image objects at one second before and one second after a connection point where the two moving image objects are connected are repeatedly alternately displayed as the preview image 1503. This enables the user to grasp an image of connection of the two moving image objects while watching this preview image. Further, when the two moving image objects are connected by further moving them closer to each other, a moving image object 1504 representing a thus formed one index entry is displayed. At this time, the display of the preview image 1503 is stopped.

FIG. 16 shows an example of a method of displaying a case where moving image objects which cannot be connected are attempted to be connected. In the illustrated example in FIG. 16, there are moving image objects 1601 and 1602 selected for connection, and these two moving image objects 1601 and 1602 are made closer to each other by moving the fingers. As described above, normally, when the distance between the two moving image objects becomes smaller than a certain threshold, the two moving image objects are connected. However, if it is determined that the two moving image objects cannot be connected e.g. due to attributes thereof, when the fingers are removed from the moving image objects, the two moving image objects are displayed in a manner repelling each other such that they are disposed at respective positions spaced from each other by a distance 1604. Examples of the case causing such a display include a case where two moving image data items represented by respective moving image objects are different e.g. in attributes concerning the encoding method of moving image data. For example, it is a case where one moving image data item is compressed by MPEG1, and the other moving image data item is compressed by MPEG2. By displaying the two moving image objects in a manner repelling each other as mentioned above, it is possible to make the user aware that the two moving image objects cannot be connected. It should be noted that a warning may be given by displaying a message saying that the two moving image objects cannot be connected.

As described above, according to the present embodiment, it is possible to freely manipulate the timeline display of a moving image by an operation using fingers on a touch panel, whereby the user can view details of a desired portion of a moving image in a manner focusing thereon. Further, also when the user desires to sparsely view the content of a moving image, it is possible to sparsely display the content by the timeline display. The timeline display as described above enables the user to freely operate moving images.

It should be noted that the control by the overall controller 114 may be performed by one unit of hardware, or a plurality of units of hardware may share the processes to perform the overall operation of the device. Further, it should be noted that although the present invention has been described based on the preferred embodiment, the present invention is not limited to the above-described embodiments, but it can be practiced in various forms, without departing from the spirit and scope thereof. Further, the above-described embodiments merely show one embodiment of the present invention, it is also possible to combine the above-described embodiments as appropriate. Further, although in the above-described embodiment, the present invention is applied to a digital camera, by way of example, this is not limitative. That is, the present invention can be applied to a personal computer, a PDA, a cellular phone terminal, a mobile image viewer, a display provided in a print device for selecting and confirming an image to be printed, a digital photo frame and the like. That is, the present invention can be applied to any other display control device insofar as it can cause the timeline of a moving image to be displayed on a display device which is a touch panel. It should be noted that the present invention can be applied to not only copying of moving image data, but also copying of data using a display object representative of other data (content data of a still image, a text file, a music file, and so forth).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-036381, filed Feb. 22, 2010, Japanese Patent Application No. 2010-036466, filed Feb. 22, 2010, and Japanese Patent Application No. 2010-036398, filed Feb. 22, 2010, which are hereby incorporated by reference herein in its entirety.

What is claimed is:

1. A display control device, comprising:
a display section;
a display control unit configured to control said display section to display at least one display object each representing a moving image;
a detection unit configured to detect any touched position on said display section;
a first determination unit configured to determine whether or not two touched positions are detected on a single one of the at least one display object displayed on said display section, by said detection unit;
a second determination unit configured to be operable when said first determination unit determines that two touched positions are detected on the single display object, to determine based on detection by said detection unit whether or not the two touched positions are moved while each keeping a touched state thereof; and
a control unit configured to be operable when said second determination unit determines that the two touched positions are moved while each keeping a touched state thereof, to extract frame images of which the number depends on a distance between the two touched positions after movement thereof, from a moving image represented by the single display object, and control said display control unit to display the extracted frame images between the two touched positions after the movement thereof; and
further comprising a third determination unit configured to be operable when said first determination unit determines that two touched positions are detected on the single display object, to determine based on detection by said detection unit whether or not the two touched positions are moved while each keeping a touched state thereof in a first direction perpendicular to a direction of arrangement of the plurality of frame images disposed on the display object,
wherein said second determination unit determines whether or not the two touched positions are moved in a second direction parallel to the direction of arrangement of the plurality of frame images disposed on the display object,
wherein when said second determination unit determines that the two touched positions are moved while each keeping a touched state thereof in the second direction, said control unit extracts frame images of which the number depends on the distance between the two touched positions after the movement thereof from a moving image represented by the single display object, and controls said display control unit to display the extracted frame images between the two touched positions after the movement thereof, and
wherein when said third determination unit determines that the two touched positions are moved while each keeping a touched state thereof in the first direction, said control unit causes a duplicate of the moving image represented by the display object to be formed and stored in a storage medium.

2. The display control device according to claim 1, wherein said control unit causes the number of images to be displayed to be reduced when the distance between the two touched positions after the movement thereof is smaller than before the movement thereof, and causes the number of images to be displayed to be increased when the distance between the two touched positions after the movement thereof is larger than before the movement thereof.

3. The display control device according to claim 1, wherein said control unit controls said display control unit not to make the display object larger than a predetermined size when the distance between the two touched positions after the movement thereof is larger than a predetermined value.

4. The display control device according to claim 1, wherein said control unit extracts frame images of which the number depends on the distance between the two touched positions after the movement thereof such that time intervals between the frame images become equal to each other.

5. The display control device according to claim 1, wherein said control unit controls said display control unit to display a predetermined one of images of the moving image represented by the display object, when the number of images to be displayed on the display object becomes equal to one.

6. The display control device according to claim 5, wherein the predetermined image is a leading frame image of the moving image represented by the display object or an image designated by a user.

7. The display control device according to claim 1, wherein said display control unit displays each image of the display object in a state information indicative of a time position of the image is added thereto.

8. The display control device according to claim 1, further comprising:
a position change control unit configured to control said display control unit to change a display position of the display object displayed at the touched position detected by said detection unit in a manner following movement of the touched position;
a fourth determination unit configured to determine whether or not two positions on said display section are touched, and different display objects are touched at the touched positions, respectively; and
a fifth determination unit configured to be operable when said fourth determination unit determines that the two different display objects are touched, to determine whether or not a distance between the two touched positions has become not larger than a predetermined value by the movement of the touched positions,
wherein when said fifth determination unit determines that the distance between the two touched positions has become not larger than the predetermined value, said control unit causes a single moving image to be created in which moving images represented by the different display objects, respectively, are connected in an order based on respective display positions of the display objects caused to be changed through control by said position change control unit.

9. A method of controlling display of a display object representing a moving image on a display section, comprising:
detecting any touched position on the display section;
determining whether or not two touched positions are detected on a single display object displayed on the display section, by said detecting;
determining based on detection by said detecting, when it is determined that two touched positions are detected on the single display object, whether or not the two touched positions are moved while each keeping a touched state thereof; and
extracting, when it is determined that the two touched positions are moved while each keeping a touched state thereof, frame images of which the number depends on a distance between the two touched positions after movement thereof, from a moving image represented by the single display object, and causing the extracted frame images to be displayed between the two touched positions after the movement thereof;
determining based on detection by said detecting, when it is determined that two touched positions are detected on the single display object, whether or not the two touched positions are moved while each keeping a touched state thereof in a first direction perpendicular to a direction of arrangement of the plurality of frame images disposed on the display object,
determining whether or not the two touched positions are moved in a second direction parallel to the direction of arrangement of the plurality of frame images disposed on the display object,
extracting frame images of which the number depends on the distance between the two touched positions after the movement thereof from a moving image represented by the single display object, when it is determined that the two touched positions are moved while each keeping a touched state thereof in the second direction; and
displaying the extracted frame images between the two touched positions after the movement thereof; and
causing a duplicate of the moving image represented by the display object to be formed and stored in a storage medium, when it is determined that the two touched positions are moved while each keeping a touched state thereof in the first direction.

10. A non-transitory computer-readable storage medium storing a computer-executable program for causing a computer to execute a method of controlling display of a display object representing a moving image on a display section,
wherein the method comprises:
detecting any touched position on the display section;
determining whether or not two touched positions are detected on a single display object displayed on the display section, by said detecting;
determining based on detection by said detecting, when it is determined that two touched positions are detected on the single display object, whether or not the two touched positions are moved while each keeping a touched state thereof; and
extracting, when it is determined that the two touched positions are moved while each keeping a touched state thereof, frame images of which the number depends on a distance between the two touched positions after movement thereof, from a moving image represented by the single display object, and causing the extracted frame images to be displayed between the two touched positions after the movement thereof;
determining based on detection by said detecting, when it is determined that two touched positions are detected on the single display object, whether or not the two touched positions are moved while each keeping a touched state thereof in a first direction perpendicular to a direction of arrangement of the plurality of frame images disposed on the display object,
determining whether or not the two touched positions are moved in a second direction parallel to the direction of arrangement of the plurality of frame images disposed on the display object,
extracting frame images of which the number depends on the distance between the two touched positions after the movement thereof from a moving image represented by the single display object, when it is determined that the two touched positions are moved while each keeping a touched state thereof in the second direction; and
displaying the extracted frame images between the two touched positions after the movement thereof; and
causing a duplicate of the moving image represented by the display object to be formed and stored in a storage medium, when it is determined that the two touched positions are moved while each keeping a touched state thereof in the first direction.

11. A display control device, comprising:
a display section;
a display control unit configured to control said display section to display at least one display object each representing a moving image;
a detection unit configured to detect any touched position on said display section;
a first determination unit configured to determine whether or not two touched positions are detected on a single one of the at least one display object displayed on said display section, by said detection unit;
a second determination unit configured to be operable when said first determination unit determines that two touched positions are detected on the single display object, to determine based on detection by said detection unit whether or not the two touched positions are moved while each keeping a touched state thereof; and
a control unit configured to be operable when said second determination unit determines that the two touched positions are moved while each keeping a touched state thereof, to extract frame images of which the number depends on a distance between the two touched positions after movement thereof, from a moving image represented by the single display object, and control said display control unit to display the extracted frame images between the two touched positions after the movement thereof;
a position change control unit configured to control said display control unit to change a display position of the display object displayed at the touched position detected by said detection unit in a manner following movement of the touched position;
a fourth determination unit configured to determine whether or not two positions on said display section are touched, and different display objects are touched at the touched positions, respectively; and
a fifth determination unit configured to be operable when said fourth determination unit determines that the two different display objects are touched, to determine whether or not a distance between the two touched positions has become not larger than a predetermined value by the movement of the touched positions,
wherein when said fifth determination unit determines that the distance between the two touched positions has become not larger than the predetermined value, said control unit causes a single moving image to be created in which moving images represented by the different display objects, respectively, are connected in an order based on respective display positions of the display objects caused to be changed through control by said position change control unit.

12. The display control device according to claim 11, wherein said control unit causes the number of images to be displayed to be reduced when the distance between the two touched positions after the movement thereof is smaller than before the movement thereof, and causes the number of images to be displayed to be increased when the distance between the two touched positions after the movement thereof is larger than before the movement thereof.

13. The display control device according to claim 11, wherein said control unit controls said display control unit not to make the display object larger than a predetermined size when the distance between the two touched positions after the movement thereof is larger than a predetermined value.

14. The display control device according to claim 11, wherein said control unit extracts frame images of which the number depends on the distance between the two touched positions after the movement thereof such that time intervals between the frame images become equal to each other.

15. The display control device according to claim 11, wherein said control unit controls said display control unit to display a predetermined one of images of the moving image represented by the display object, when the number of images to be displayed on the display object becomes equal to one.

16. The display control device according to claim 15, wherein the predetermined image is a leading frame image of the moving image represented by the display object or an image designated by a user.

17. The display control device according to claim 11, wherein said display control unit displays each image of the display object in a state information indicative of a time position of the image is added thereto.

18. A method of controlling display of a display object representing a moving image on a display section, comprising:
detecting any touched position on the display section;
determining whether or not two touched positions are detected on a single display object displayed on the display section, by said detecting;
determining based on detection by said detecting, when it is determined that two touched positions are detected on the single display object, whether or not the two touched positions are moved while each keeping a touched state thereof; and
extracting, when it is determined that the two touched positions are moved while each keeping a touched state thereof, frame images of which the number depends on a distance between the two touched positions after movement thereof, from a moving image represented by the single display object, and causing the extracted frame images to be displayed between the two touched positions after the movement thereof;
changing a display position of the display object displayed at the touched position detected by said detection unit in a manner following movement of the touched position;
determining whether or not two positions on said display section are touched, and different display objects are touched at the touched positions, respectively; and
determining, when it is determined that the two different display objects are touched, whether or not a distance between the two touched positions has become not larger than a predetermined value by the movement of the touched positions; and
causing a single moving image to be created in which moving images represented by the different display objects, respectively, are connected in an order based on respective display positions of the display objects caused to be changed, when it is determined that the distance between the two touched positions has become not larger than the predetermined value.

19. A non-transitory computer-readable storage medium storing a computer-executable program for causing a computer to execute a method of controlling display of a display object representing a moving image on a display section,
wherein the method comprises:
detecting any touched position on the display section;
determining whether or not two touched positions are detected on a single display object displayed on the display section, by said detecting;
determining based on detection by said detecting, when it is determined that two touched positions are detected on the single display object, whether or not the two touched positions are moved while each keeping a touched state thereof; and
extracting, when it is determined that the two touched positions are moved while each keeping a touched state thereof, frame images of which the number depends on a distance between the two touched positions after movement thereof, from a moving image represented by the single display object, and causing the extracted frame images to be displayed between the two touched positions after the movement thereof;

changing a display position of the display object displayed at the touched position detected by said detection unit in a manner following movement of the touched position;

determining whether or not two positions on said display section are touched, and different display objects are touched at the touched positions, respectively; and determining, when it is determined that the two different display objects are touched, whether or not a distance between the two touched positions has become not larger than a predetermined value by the movement of the touched positions; and causing a single moving image to be created in which moving images represented by the different display objects, respectively, are connected in an order based on respective display positions of the display objects caused to be changed, when it is determined that the distance between the two touched positions has become not larger than the predetermined value.

* * * * *